(12) United States Patent
Flament

(10) Patent No.: US 10,936,843 B2
(45) Date of Patent: Mar. 2, 2021

(54) SEGMENTED IMAGE ACQUISITION

(71) Applicant: InvenSense, Inc., San Jose, CA (US)

(72) Inventor: Bruno Flament, Saint Julien de Ratz (FR)

(73) Assignee: InvenSense, Inc., San Jose, CA (US)

(\*) Notice: Subject to any disclaimer, the term of this patent is extended or adjusted under 35 U.S.C. 154(b) by 0 days.

(21) Appl. No.: 16/236,158

(22) Filed: Dec. 28, 2018

(65) Prior Publication Data

US 2020/0210666 A1 Jul. 2, 2020

(51) Int. Cl.
| | | |
|---|---|---|
| G10K 11/34 | (2006.01) | |
| G06K 9/00 | (2006.01) | |
| G10K 11/26 | (2006.01) | |
| G06K 9/20 | (2006.01) | |
| G06K 9/03 | (2006.01) | |
| B06B 1/02 | (2006.01) | |

(52) U.S. Cl.
CPC .......... G06K 9/0002 (2013.01); B06B 1/0207 (2013.01); G06K 9/00026 (2013.01); G06K 9/03 (2013.01); G06K 9/209 (2013.01); G10K 11/26 (2013.01)

(58) Field of Classification Search
CPC .... G06K 9/00026; G06K 9/0002; G06K 9/03; G06K 9/209; B06B 1/0207; G10K 11/26
USPC ........................................................ 382/126
See application file for complete search history.

(56) References Cited

U.S. PATENT DOCUMENTS

| | | | |
|---|---|---|---|
| 5,575,286 A | 11/1996 | Weng et al. | |
| 5,684,243 A | 11/1997 | Gururaja et al. | |
| 5,808,967 A | 9/1998 | Yu et al. | |
| 5,867,302 A | 2/1999 | Fleming | |
| 5,911,692 A | 6/1999 | Hussain et al. | |
| 6,071,239 A | 6/2000 | Cribbs et al. | |
| 6,104,673 A | 8/2000 | Cole et al. | |
| 6,289,112 B1 | 9/2001 | Jain et al. | |
| 6,350,652 B1 | 2/2002 | Libera et al. | |
| 6,428,477 B1 | 8/2002 | Mason | |
| 6,500,120 B1 | 12/2002 | Anthony | |
| 6,676,602 B1 | 1/2004 | Barnes et al. | |
| 6,736,779 B1 | 5/2004 | Sano et al. | |
| 7,067,962 B2 | 6/2006 | Scott | |

(Continued)

FOREIGN PATENT DOCUMENTS

| | | |
|---|---|---|
| CN | 1826631 A | 8/2006 |
| CN | 102159334 A | 8/2011 |

(Continued)

OTHER PUBLICATIONS

Tang, et al., "Pulse-Echo Ultrasonic Fingerprint Sensor on a Chip", IEEE Transducers, Anchorage, Alaska, USA, Jun. 21-25, 2015, pp. 674-677.

(Continued)

*Primary Examiner* — Abdul-Samad A Adediran

(57) ABSTRACT

In a method of segmented image acquisition at a sensor, a plurality of segments of an image are concurrently captured, wherein pixels of each segment of the plurality of segments are captured according to a pixel capture sequence. The pixel capture sequence for at least one segment of the plurality of segments is a non-progressive sequence for controlling a timing difference between pixel capture for proximate pixels of adjacent segments. The image including the plurality of segments is generated.

21 Claims, 13 Drawing Sheets

(56) References Cited

U.S. PATENT DOCUMENTS

| | | |
|---|---|---|
| 7,109,642 B2 | 9/2006 | Scott |
| 7,243,547 B2 | 7/2007 | Cobianu et al. |
| 7,400,750 B2 | 7/2008 | Nam |
| 7,433,034 B1 | 10/2008 | Huang |
| 7,459,836 B2 | 12/2008 | Scott |
| 7,471,034 B2 | 12/2008 | Schlote-Holubek et al. |
| 7,489,066 B2 | 2/2009 | Scott et al. |
| 7,634,117 B2 | 12/2009 | Cho |
| 7,739,912 B2 | 6/2010 | Schneider et al. |
| 8,018,010 B2 | 9/2011 | Tigli et al. |
| 8,139,827 B2 | 3/2012 | Schneider et al. |
| 8,255,698 B2 | 8/2012 | Li et al. |
| 8,311,514 B2 | 11/2012 | Bandyopadhyay et al. |
| 8,335,356 B2 | 12/2012 | Schmitt |
| 8,433,110 B2 | 4/2013 | Kropp et al. |
| 8,508,103 B2 | 8/2013 | Schmitt et al. |
| 8,515,135 B2 | 8/2013 | Clarke et al. |
| 8,666,126 B2 | 3/2014 | Lee et al. |
| 8,703,040 B2 | 4/2014 | Liufu et al. |
| 8,723,399 B2 | 5/2014 | Sammoura et al. |
| 8,805,031 B2 | 8/2014 | Schmitt |
| 9,056,082 B2 | 6/2015 | Liautaud et al. |
| 9,070,861 B2 | 6/2015 | Bibl et al. |
| 9,224,030 B2 | 12/2015 | Du et al. |
| 9,245,165 B2 | 1/2016 | Slaby et al. |
| 9,424,456 B1 | 8/2016 | Kamath Koteshwara et al. |
| 9,572,549 B2 | 2/2017 | Belevich et al. |
| 9,582,102 B2 | 2/2017 | Setlak |
| 9,607,203 B1 | 3/2017 | Yazdandoost et al. |
| 9,607,206 B2 | 3/2017 | Schmitt et al. |
| 9,613,246 B1 | 4/2017 | Gozzini et al. |
| 9,665,763 B2 | 5/2017 | Du et al. |
| 9,747,488 B2 | 8/2017 | Yazdandoost et al. |
| 9,785,819 B1 | 10/2017 | Oreifej |
| 9,815,087 B2 | 11/2017 | Ganti et al. |
| 9,817,108 B2 | 11/2017 | Kuo et al. |
| 9,818,020 B2 | 11/2017 | Schuckers et al. |
| 9,881,195 B2 | 1/2018 | Lee et al. |
| 9,881,198 B2 | 1/2018 | Lee et al. |
| 9,898,640 B2 | 2/2018 | Ghavanini |
| 9,904,836 B2 | 2/2018 | Yeke Yazdandoost et al. |
| 9,909,225 B2 | 3/2018 | Lee et al. |
| 9,922,235 B2 | 3/2018 | Cho et al. |
| 9,934,371 B2 | 4/2018 | Hong et al. |
| 9,939,972 B2 | 4/2018 | Shepelev et al. |
| 9,953,205 B1 | 4/2018 | Rasmussen et al. |
| 9,959,444 B2 | 5/2018 | Young et al. |
| 9,967,100 B2 | 5/2018 | Hong et al. |
| 9,983,656 B2 | 5/2018 | Merrell et al. |
| 9,984,271 B1 | 5/2018 | King et al. |
| 10,275,638 B1 | 4/2019 | Yousefpor et al. |
| 10,315,222 B2 | 6/2019 | Salvia et al. |
| 10,461,124 B2 | 10/2019 | Berger et al. |
| 10,478,858 B2 | 11/2019 | Lasiter et al. |
| 10,539,539 B2 | 1/2020 | Garlepp et al. |
| 10,600,403 B2 | 3/2020 | Garlepp et al. |
| 10,656,255 B2 | 5/2020 | Ng et al. |
| 10,670,716 B2 | 6/2020 | Apte et al. |
| 10,706,835 B2 | 7/2020 | Garlepp et al. |
| 10,755,067 B2 | 8/2020 | De Foras et al. |
| 2002/0135273 A1 | 9/2002 | Mauchamp et al. |
| 2003/0013955 A1 | 1/2003 | Poland |
| 2004/0085858 A1 | 5/2004 | Khuri-Yakub et al. |
| 2004/0122316 A1 | 6/2004 | Satoh et al. |
| 2004/0174773 A1 | 9/2004 | Thomenius et al. |
| 2005/0023937 A1 | 2/2005 | Sashida et al. |
| 2005/0057284 A1 | 3/2005 | Wodnicki |
| 2005/0100200 A1 | 5/2005 | Abiko et al. |
| 2005/0110071 A1 | 5/2005 | Ema et al. |
| 2005/0146240 A1 | 7/2005 | Smith et al. |
| 2005/0148132 A1 | 7/2005 | Wodnicki et al. |
| 2005/0162040 A1 | 7/2005 | Robert |
| 2006/0052697 A1 | 3/2006 | Hossack et al. |
| 2006/0079777 A1 | 4/2006 | Karasawa |
| 2007/0046396 A1 | 3/2007 | Huang |
| 2007/0047785 A1 | 3/2007 | Jang et al. |
| 2007/0073135 A1 | 3/2007 | Lee et al. |
| 2007/0202252 A1 | 8/2007 | Sasaki |
| 2007/0215964 A1 | 9/2007 | Khuri-Yakub et al. |
| 2007/0230754 A1 | 10/2007 | Jain et al. |
| 2008/0125660 A1 | 5/2008 | Yao et al. |
| 2008/0150032 A1 | 6/2008 | Tanaka |
| 2008/0194053 A1 | 8/2008 | Huang |
| 2008/0240523 A1* | 10/2008 | Benkley ............ G06K 9/00026 382/126 |
| 2009/0005684 A1 | 1/2009 | Kristoffersen et al. |
| 2009/0182237 A1 | 7/2009 | Angelsen et al. |
| 2009/0274343 A1 | 11/2009 | Clarke |
| 2009/0303838 A1 | 12/2009 | Svet |
| 2010/0030076 A1 | 2/2010 | Vortman et al. |
| 2010/0046810 A1 | 2/2010 | Yamada |
| 2010/0113952 A1 | 5/2010 | Raguin et al. |
| 2010/0168583 A1 | 7/2010 | Dausch et al. |
| 2010/0195851 A1 | 8/2010 | Buccafusca |
| 2010/0201222 A1 | 8/2010 | Adachi et al. |
| 2010/0202254 A1 | 8/2010 | Roest et al. |
| 2010/0239751 A1 | 9/2010 | Regniere |
| 2010/0251824 A1 | 10/2010 | Schneider et al. |
| 2010/0256498 A1 | 10/2010 | Tanaka |
| 2010/0278008 A1 | 11/2010 | Ammar |
| 2011/0285244 A1 | 11/2011 | Lewis et al. |
| 2011/0291207 A1 | 12/2011 | Martin et al. |
| 2012/0016604 A1 | 1/2012 | Irving et al. |
| 2012/0092026 A1 | 4/2012 | Liautaud et al. |
| 2012/0095347 A1 | 4/2012 | Adam et al. |
| 2012/0147698 A1 | 6/2012 | Wong et al. |
| 2012/0232396 A1 | 9/2012 | Tanabe |
| 2012/0238876 A1 | 9/2012 | Tanabe et al. |
| 2012/0279865 A1 | 11/2012 | Regniere et al. |
| 2012/0288641 A1 | 11/2012 | Diatezua et al. |
| 2012/0300988 A1 | 11/2012 | Ivanov et al. |
| 2013/0051179 A1 | 2/2013 | Hong |
| 2013/0064043 A1 | 3/2013 | Degertekin et al. |
| 2013/0127592 A1 | 5/2013 | Fyke et al. |
| 2013/0133428 A1 | 5/2013 | Lee et al. |
| 2013/0201134 A1 | 8/2013 | Schneider et al. |
| 2013/0271628 A1 | 10/2013 | Ku et al. |
| 2013/0294202 A1 | 11/2013 | Hajati |
| 2014/0060196 A1 | 3/2014 | Falter et al. |
| 2014/0117812 A1 | 5/2014 | Hajati |
| 2014/0176332 A1 | 6/2014 | Alameh et al. |
| 2014/0208853 A1 | 7/2014 | Onishi et al. |
| 2014/0219521 A1 | 8/2014 | Schmitt et al. |
| 2014/0232241 A1 | 8/2014 | Hajati |
| 2014/0265721 A1 | 9/2014 | Robinson et al. |
| 2014/0313007 A1 | 10/2014 | Harding |
| 2014/0355387 A1 | 12/2014 | Kitchens et al. |
| 2015/0036065 A1 | 2/2015 | Yousefpor et al. |
| 2015/0049590 A1 | 2/2015 | Rowe et al. |
| 2015/0087991 A1 | 3/2015 | Chen et al. |
| 2015/0097468 A1 | 4/2015 | Hajati et al. |
| 2015/0145374 A1 | 5/2015 | Xu et al. |
| 2015/0164473 A1 | 6/2015 | Kim et al. |
| 2015/0165479 A1 | 6/2015 | Lasiter et al. |
| 2015/0169136 A1 | 6/2015 | Ganti et al. |
| 2015/0189136 A1 | 7/2015 | Chung et al. |
| 2015/0198699 A1 | 7/2015 | Kuo et al. |
| 2015/0206738 A1 | 7/2015 | Rastegar |
| 2015/0213180 A1 | 7/2015 | Herberholz |
| 2015/0220767 A1 | 8/2015 | Yoon et al. |
| 2015/0261261 A1 | 9/2015 | Bhagavatula et al. |
| 2015/0286312 A1 | 10/2015 | Kang et al. |
| 2015/0301653 A1 | 10/2015 | Urushi |
| 2015/0345987 A1 | 12/2015 | Hajati |
| 2016/0051225 A1 | 2/2016 | Kim et al. |
| 2016/0063294 A1 | 3/2016 | Du et al. |
| 2016/0070967 A1 | 3/2016 | Du et al. |
| 2016/0086010 A1 | 3/2016 | Merrell et al. |
| 2016/0092716 A1 | 3/2016 | Yazdandoost et al. |
| 2016/0100822 A1 | 4/2016 | Kim et al. |
| 2016/0107194 A1 | 4/2016 | Panchawagh et al. |
| 2016/0180142 A1 | 6/2016 | Riddle et al. |
| 2016/0326477 A1 | 11/2016 | Fernandez-Alcon et al. |
| 2016/0358003 A1 | 12/2016 | Shen et al. |

(56) References Cited

U.S. PATENT DOCUMENTS

| | | |
|---|---|---|
| 2017/0004352 A1 | 1/2017 | Jonsson et al. |
| 2017/0330552 A1 | 1/2017 | Garlepp et al. |
| 2017/0032485 A1 | 2/2017 | Vemury |
| 2017/0075700 A1 | 3/2017 | Abudi et al. |
| 2017/0100091 A1 | 4/2017 | Eigil et al. |
| 2017/0110504 A1 | 4/2017 | Panchawagh et al. |
| 2017/0119343 A1 | 5/2017 | Pintoffl |
| 2017/0124374 A1 | 5/2017 | Rowe et al. |
| 2017/0168543 A1 | 6/2017 | Dai et al. |
| 2017/0185821 A1 | 6/2017 | Chen et al. |
| 2017/0194934 A1 | 7/2017 | Shelton et al. |
| 2017/0219536 A1 | 8/2017 | Koch et al. |
| 2017/0231534 A1 | 8/2017 | Agassy et al. |
| 2017/0255338 A1 | 9/2017 | Medina et al. |
| 2017/0293791 A1 | 10/2017 | Mainguet et al. |
| 2017/0316243 A1 | 11/2017 | Ghavanini |
| 2017/0316248 A1 | 11/2017 | He et al. |
| 2017/0322290 A1 | 11/2017 | Ng |
| 2017/0322291 A1 | 11/2017 | Salvia et al. |
| 2017/0322292 A1 | 11/2017 | Salvia et al. |
| 2017/0322305 A1 | 11/2017 | Apte et al. |
| 2017/0323133 A1 | 11/2017 | Tsai |
| 2017/0326590 A1 | 11/2017 | Daneman |
| 2017/0326591 A1 | 11/2017 | Apte et al. |
| 2017/0326593 A1 | 11/2017 | Garlepp et al. |
| 2017/0326594 A1 | 11/2017 | Berger et al. |
| 2017/0328866 A1 | 11/2017 | Apte et al. |
| 2017/0328870 A1 | 11/2017 | Garlepp et al. |
| 2017/0330012 A1 | 11/2017 | Salvia et al. |
| 2017/0330553 A1* | 11/2017 | Garlepp ............ B06B 1/0207 |
| 2017/0357839 A1 | 12/2017 | Yazdandoost et al. |
| 2018/0025202 A1 | 1/2018 | Ryshtun et al. |
| 2018/0101711 A1 | 4/2018 | D'Souza et al. |
| 2018/0129857 A1 | 5/2018 | Bonev |
| 2018/0206820 A1 | 7/2018 | Anand et al. |
| 2018/0229267 A1 | 8/2018 | Ono et al. |
| 2018/0349663 A1 | 12/2018 | Garlepp et al. |
| 2018/0357457 A1 | 12/2018 | Rasmussen et al. |
| 2018/0369866 A1 | 12/2018 | Sammoura et al. |
| 2019/0005300 A1 | 1/2019 | Garlepp et al. |
| 2019/0018123 A1 | 1/2019 | Narasimha-Iyer et al. |
| 2019/0102046 A1 | 4/2019 | Miranto et al. |
| 2019/0171858 A1 | 6/2019 | Ataya et al. |
| 2019/0188441 A1 | 6/2019 | Hall et al. |
| 2019/0188442 A1 | 6/2019 | Flament et al. |
| 2020/0030850 A1 | 1/2020 | Apte et al. |
| 2020/0050828 A1 | 2/2020 | Li et al. |
| 2020/0074135 A1 | 3/2020 | Garlepp et al. |

FOREIGN PATENT DOCUMENTS

| | | |
|---|---|---|
| CN | 105264542 A | 1/2016 |
| CN | 109255323 A | 1/2019 |
| EP | 1214909 A1 | 6/2002 |
| EP | 2884301 A1 | 6/2015 |
| EP | 3086261 A2 | 10/2016 |
| JP | 2011040467 A | 2/2011 |
| WO | 2009096576 A2 | 8/2009 |
| WO | 2009137106 A2 | 11/2009 |
| WO | 2014035564 A1 | 3/2014 |
| WO | 2015009635 A1 | 1/2015 |
| WO | 2015112453 A1 | 7/2015 |
| WO | 2015120132 A1 | 8/2015 |
| WO | 2015131083 A1 | 9/2015 |
| WO | 2015134816 A1 | 9/2015 |
| WO | 2015183945 A1 | 12/2015 |
| WO | 2016007250 A1 | 1/2016 |
| WO | 2016011172 A1 | 1/2016 |
| WO | 2016040333 A2 | 3/2016 |
| WO | 2016061406 A1 | 4/2016 |
| WO | 2016061410 A1 | 4/2016 |
| WO | 2017003848 A1 | 1/2017 |
| WO | 2017053877 A2 | 3/2017 |
| WO | 2017192895 A1 | 11/2017 |
| WO | 2017196678 A1 | 11/2017 |
| WO | 2017196682 A1 | 11/2017 |
| WO | 2017192903 A3 | 12/2017 |

OTHER PUBLICATIONS

ISA/EP, International Search Report and Written Opinion for International Application No. PCT/US2017/031120, 12 pages, dated Aug. 29, 2017 (Aug. 29, 2017).

ISA/EP, International Search Report and Written Opinion for International Application No. PCT/US2017/031120, 13 pages, dated Sep. 1, 2017 (Sep. 1, 2017).

ISA/EP, International Search Report and Written Opinion for International Application No. PCT/US2017/031134, 12 pages, dated Aug. 30, 2017 (Aug. 30, 2017).

ISA/EP, International Search Report and Written Opinion for International Application No. PCT/US2017/031140, 18 pages, dated Nov. 2, 2017 (Nov. 2, 2017).

ISA/EP, International Search Report and Written Opinion for International Application No. PCT/US2017/031421 13 pages, dated Jun. 21, 2017 (Jun. 21, 2017).

ISA/EP, International Search Report and Written Opinion for International Application No. PCT/US2017/031426 13 pages, dated Jun. 22, 2017 (Jun. 22, 2017).

ISA/EP, International Search Report and Written Opinion for International Application No. PCT/US2017/031431, 14 pages, dated Aug. 1, 2017 (Aug. 1, 2017).

ISA/EP, International Search Report and Written Opinion for International Application No. PCT/US2017/031434, 13 pages, dated Jun. 26, 2017 (Jun. 26, 2017).

ISA/EP, International Search Report and Written Opinion for International Application No. PCT/US2017/031439, 10 pages, dated Jun. 20, 2017 (Jun. 20, 2017).

ISA/EP, International Search Report and Written Opinion for International Application No. PCT/US2017/031824, 18 pages, dated Sep. 22, 2017 (Sep. 22, 2017).

ISA/EP, International Search Report and Written Opinion for International Application No. PCT/US2017/031827, 16 pages, dated Aug. 1, 2017 (Aug. 1, 2017).

ISA/EP, International Search Report and Written Opinion for International Application No. PCT/US2017/031831, 12 pages, dated Jul. 21, 2017 (Jul. 21, 2017).

ISA/EP, International Search Report for International Application No. PCT/US2017/031826, 16 pages, dated Feb. 27, 2018 (Feb. 27, 2018).

ISA/EP, Partial International Search Report for International Application No. PCT/US2017/031140, 13 pages, Aug. 29, 2017 (Aug. 29, 2017).

ISA/EP, Partial International Search Report for International Application No. PCT/US2017/031823, 12 pages, dated Nov. 30, 2017 (Nov. 30, 2017).

Dausch, et al., "Theory and Operation of 2-D Array Piezoelectric Micromachined Ultrasound Transducers", IEEE Transactions on Ultrasonics, and Frequency Control, vol. 55, No. 11;, Nov. 2008, 2484-2492.

Hopcroft, et al., "Temperature Compensation of a MEMS Resonator Using Quality Factor as a Thermometer", Retrieved from Internet: http://micromachine.stanford.edu/~amanu/linked/MAH_MEMS2006.pdf, 2006, 222-225.

Hopcroft, et al., "Using the temperature dependence of resonator quality factor as a thermometer", Applied Physics Letters 91. Retrieved from Internet: http://micromachine.stanford.edu/~hopcroft/Publications/Hopcroft_QT_ApplPhysLett_91_013505.pdf, 2007, 013505-1-031505-3.

Lee, et al., "Low jitter and temperature stable MEMS oscillators", Frequency Control Symposium (FCS), 2012 IEEE International, May 2012, 1-5.

Li, et al., "Capacitive micromachined ultrasonic transducer for ultra-low pressure measurement: Theoretical study", AIP Advances 5.12. Retrieved from Internet: http://scitation.aip.org/content/aip/journal/adva/5/12/10.1063/1.4939217, 2015, 127231.

(56) References Cited

OTHER PUBLICATIONS

Qiu, et al., "Piezoelectric Micromachined Ultrasound Transducer (PMUT) Arrays for Integrated Sensing, Actuation and Imaging", Sensors 15, doi:10.3390/s150408020, Apr. 3, 2015, 8020-8041.
Rozen, et al., "Air-Coupled Aluminum Nitride Piezoelectric Micromachined Ultrasonic Transducers at 0.3 MHZ to 0.9 MHZ", 2015 28th IEEE International Conference on Micro Electro Mechanical Systems (MEMS), IEEE, Jan. 18, 2015, 921-924.
Savoia, et al., "Design and Fabrication of a cMUT Probe for Ultrasound Imaging of Fingerprints", 2010 IEEE nternational Ultrasonics Symposium Proceedings, Oct. 2010, 1877-1880.
Shen, et al., "Anisotropic Complementary Acoustic Metamaterial for Canceling out Aberrating Layers", American Physical Society, Physical Review X 4.4: 041033., Nov. 19, 2014, 041033-1-041033-7.
Thakar, et al., "Multi-resonator approach to eliminating the temperature dependence of silicon-based timing references", Hilton Head'14. Retrieved from the Internet: http://blog.narotama.acid/wp-content/uploads/2014/12/Multi-resonator-approach-to-eliminating-the-temperature-dependance-of-silicon-based-timing-references.pdf, 2014, 415-418.
ISA/EP, Partial International Search Report for International Application No. PCT/US2019/034032, 8 pages, dated Sep. 12, 2019, 8.
ISA/EP, International Search Report and Written Opinion for International Application # PCT/US2018/063431, pp. 1-15, dated Feb. 5, 2019.
ISA/EP, International Search Report and Written Opinion for International Application # PCT/US2019/015020, pp. 1-23, dated Jul. 1, 2019.
ISA/EP, International Search Report and Written Opinion for International Application # PCT/US2019/023440, pp. 1-10, dated Jun. 4, 2019.
ISA/EP, International Search Report and Written Opinion for International Application No. PCT/US2017/031127, 13 pages, dated Sep. 1, 2017.
ISA/EP, International Search Report and Written Opinion for International Application No. PCT/US2018/037364, 10 pages, dated Sep. 3, 2018.
"Moving Average Filters", Waybackmachine XP05547422, Retrieved from the Internet: URL:https://web.archive.org/web/20170809081353/https//www.analog.com/media/en/technical-documentation/dsp-book/dsp_book_Ch15.pdf [retrieved on Jan. 24, 2019], Aug 9, 2017, 1-8.
Office Action for CN App No. 201780029016.7 dated Mar. 24, 2020, 7 pages.
"Receiver Thermal Noise Threshold", Fisher Telecommunication Services, Satellite Communications. Retrieved from the Internet: URL:https://web.archive.org/web/20171027075705/http//www.fishercom.xyz:80/satellite-communications/receiver-thermal-noise-threshold.html, Oct. 27, 2017, 3.
"Sleep Mode", Wikipedia, Retrieved from the Internet: URL:https://web.archive.org/web/20170908153323/https://en.wiikipedia.org/wiki/Sleep_mode [retrieved on Jan. 25, 2019], Sep. 8, 2017, 1-3.
"TMS320C5515 Fingerprint Development Kit (FDK) Hardware Guide", Texas Instruments, Literature No. SPRUFX3, XP055547651, Apr. 2010, 1-26.

"ZTE V7 MAX. 5,5" smartphone on MediaTeck Hello P10 cpu; Published on Apr. 20, 2016; https://www.youtube.com/watch?v=ncNCbpkGQzU (Year: 2016)".
Cappelli, et al., "Fingerprint Image Reconstruction from Standard Templates", IEEE Transactions on Pattern Analysis and Machine Intelligence, IEEE Computer Society, vol. 29, No. 9, Sep. 2007, 1489-1503.
Feng, et al., "Fingerprint Reconstruction: From Minutiae to Phase", IEEE Transactions on Pattern Analysis and Machine Intelligence, IEEE Computer Society, vol. 33, No. 2, Feb. 2011, 209-223.
Jiang, et al., "Ultrasonic Fingerprint Sensor with Transmit Beamforming Based on a PMUT Array Bonded to CMOS Circuitry", IEEE Transactions on Ultrasonics Ferroelectrics and Frequency Control, Jan. 1, 2017, 1-9.
Kumar, et al., "Towards Contactless, Low-Cost and Accurate 3D Fingerprint Identification", IEEE Transactions on Pattern Analysis and Machine Intelligence, IEEE Computer Society, vol. 37, No. 3, Mar. 2015, 681-696.
Pang, et al., "Extracting Valley-Ridge Lines from Point-Cloud-Based 3D Fingerprint Models", IEEE Computer Graphics and Applications, IEEE Service Center, New York, vol. 33, No. 4, Jul./Aug. 2013, 73-81.
Papageorgiou, et al., "Self-Calibration of Ultrasonic Transducers in an Intelligent Data Acquisition System", International Scientific Journal of Computing, 2003, vol. 2, Issue 2 Retrieved Online: URL: https://scholar.google.com/scholar?q=self-calibration+of+ultrasonic+transducers+in+an+intelligent+data+acquisition+system&hl=en&as_sdt=0&as_vis=1&oi=scholart, 2003, 9-15.
Ross, et al., "From Template to Image: Reconstructing Fingerprints from Minutiae Points", IEEE Transactions on Pattern Analysis and Machine Intelligence, IEEE Computer Society, vol. 29, No. 4, Apr. 2007, 544-560.
Zhou, et al., "Partial Fingerprint Reconstruction with Improved Smooth Extension", Network and System Security, Springer Berlin Heidelberg, Jun. 3, 2013, 756-762.
ISA/EP, International Search Report and Written Opinion for International Application No. PCT/US2020/039452, 11 pages, dated Sep. 9, 2020.
ISA/EP, Partial International Search Report for International Application No. PCT/US2020/033854, 10 pages, dated Sep. 8, 2020.
ISA/EP, International Search Report and Written Opinion for International Application No. PCT/US2020/033854, 16 pages, dated Nov. 3, 2020.
ISA/EP, International Search Report and Written Opinion for International Application No. PCT/US2020/039208, 10 pages, dated Oct. 9, 2020.
ISA/EP, International Search Report and Written Opinion for International Application No. PCT/US2020/042427, 18 pages, dated Dec. 14, 2020.
ISA/EP, Partial Search Report and Provisional Opinion for International Application No. PCT/US2020/042427, 13 pages, dated Oct. 26, 2020.
Office Action for CN App No. 201780029016.7 dated Sep. 25, 2020, 7 pages.
Tang, et al., "11.2 3D Ultrasonic Fingerprint Sensor-on-a-Chip", 2016 IEEE International Solid-State Circuits conference, IEEE, Jan. 31, 2016, 202-203.

* cited by examiner

SEGMENTED IMAGE ACQUISITION

BACKGROUND

Fingerprint sensors have become ubiquitous in mobile devices as well as other applications for authenticating a user's identity. They provide a fast and convenient way for the user to unlock a device, provide authentication for payments, etc. Current fingerprint sensors are typically area sensors that obtain a two-dimensional image of the user's finger area presented to the sensor. Different technologies can be used to image the finger such as capacitive, ultrasound, and optical sensing. Once an image is obtained, that image is processed by a matcher to extract features and to compare against stored images to authenticate the user. As such, accuracy of captured images is essential to the performance of image matching for user authentication.

BRIEF DESCRIPTION OF THE DRAWINGS

The accompanying drawings, which are incorporated in and form a part of the Description of Embodiments, illustrate various embodiments of the subject matter and, together with the Description of Embodiments, serve to explain principles of the subject matter discussed below. Unless specifically noted, the drawings referred to in this Brief Description of Drawings should be understood as not being drawn to scale. Herein, like items are labeled with like item numbers.

FIG. 9 illustrates an example use of a progressive pixel capture sequence for all segments of an image, according to an embodiment.

FIG. 10 illustrates an example scoring of an image including concurrently captured segments using a progressive pixel capture sequence, according to an embodiment.

FIG. 11 illustrates an example scoring of an image including concurrently captured segments using a non-progressive pixel capture sequence, according to an embodiment.

FIG. 12 illustrates an example scoring of an image including concurrently captured segments using a plurality of non-progressive pixel capture sequences, according to an embodiment.

FIG. 13 illustrates an example scoring of an image including concurrently captured segments using a progressive pixel capture sequence and a non-progressive pixel capture sequence, according to an embodiment.

FIG. 14 illustrates an example scoring of an image including concurrently captured segments using four different pixel capture sequences, according to an embodiment.

DESCRIPTION OF EMBODIMENTS

Figure 1A:
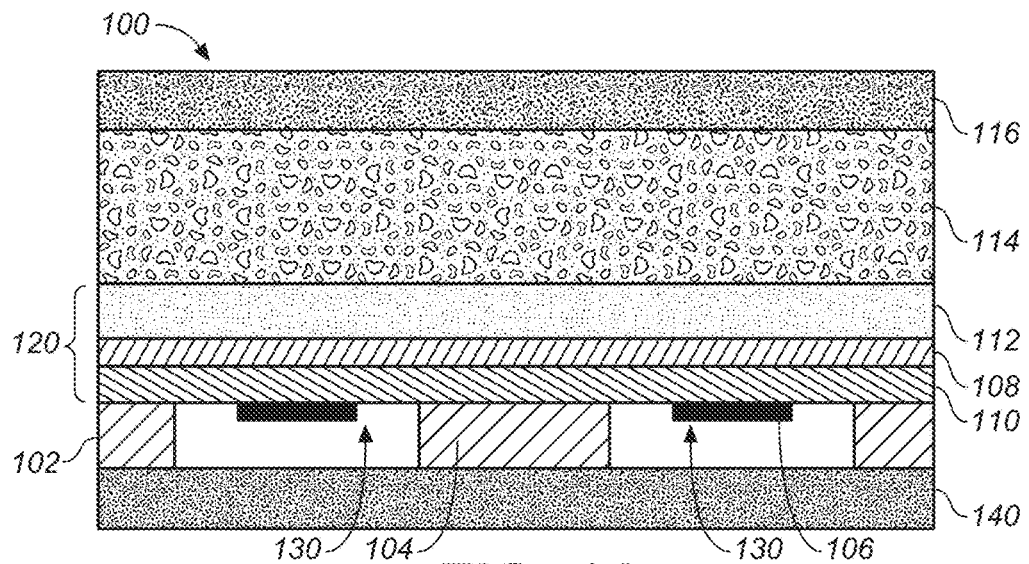
FIG. 1A is a diagram illustrating a piezoelectric micromachined ultrasonic transducer (PMUT) device having a center pinned membrane, according to some embodiments.

The following Description of Embodiments is merely provided by way of example and not of limitation. Furthermore, there is no intention to be bound by any expressed or implied theory presented in the preceding background or in the following Description of Embodiments.

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Notation and Nomenclature

Some portions of the detailed descriptions which follow are presented in terms of procedures, logic blocks, processing and other symbolic representations of operations on data within an electrical device. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities take the form of acoustic (e.g., ultrasonic) signals capable of being transmitted and received by an electronic device and/or electrical or magnetic signals capable of being stored, transferred, combined, compared, and otherwise manipulated in an electrical device.

It should be borne in mind, however, that all of these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "capturing," "generating," "determining," "receiving," "comparing," "selecting," "acquiring," "providing," "proceeding," "controlling" or the like, refer to the actions and processes of an electronic device such as an electrical device.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, logic, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example fingerprint sensing system and/or mobile electronic device described herein may include components other than those shown, including well-known components.

Various techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

Various embodiments described herein may be executed by one or more processors, such as one or more motion processing units (MPUs), sensor processing units (SPUs), host processor(s) or core(s) thereof, digital signal processors (DSPs), general purpose microprocessors, application specific integrated circuits (ASICs), application specific instruction set processors (ASIPs), field programmable gate arrays (FPGAs), a programmable logic controller (PLC), a complex programmable logic device (CPLD), a discrete gate or transistor logic, discrete hardware components, or any combination thereof designed to perform the functions described herein, or other equivalent integrated or discrete logic circuitry. The term "processor," as used herein may refer to any of the foregoing structures or any other structure suitable for implementation of the techniques described herein. As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Moreover, processors can exploit nano-scale architectures such as, but not limited to, molecular and quantum-dot based transistors, switches and gates, in order to optimize space usage or enhance performance of user equipment. A processor may also be implemented as a combination of computing processing units.

In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration.

It is to be noted that, as used in this specification and the appended claims, the singular forms "a," "an," and "the" include plural referents unless the context clearly dictates otherwise. Also, any reference herein to "top", "bottom", "upper", "lower", "up", "down", "front", "back", "first", "second", "left" or "right" is not intended to be a limitation herein. It is appreciated that, in the following description, numerous specific details are set forth to provide a thorough understanding of the examples. However, it is appreciated that the examples may be practiced without limitation to these specific details. In other instances, well-known methods and structures may not be described in detail to avoid unnecessarily obscuring the description of the examples. Also, the examples may be used in combination with each other.

Overview of Discussion

Discussion begins with a description of an example piezoelectric micromachined ultrasonic transducer (PMUT), in accordance with various embodiments. Example sensors including arrays of ultrasonic transducers are then described. Examples segmented image acquisition is then described. Example operations for the selection and use of pixel capture sequences for segmented image acquisition is then described.

Embodiments described herein provide a method for selection of a pixel capture sequence during segmented image acquisition, according to various embodiments. A plurality of pixel capture sequences for capturing segments of an image at a sensor using segmented image acquisition are received, wherein the plurality of pixel capture sequences is in accordance with electronic constraints of the sensor. During the segmented image acquisition, a timing difference between a pixel capture operation for proximate pixels of adjacent pixels of adjacent segments is determined. In one embodiment, the proximate pixels include pairs of adjacent pixels at the contiguous boundary of adjacent segments. A score based at least in part on a summation of the timing differences for proximate pixels of adjacent segments is determined. The score is compared to a stored score for another pixel capture sequence. One of the plurality of pixel capture sequences is selected based on the comparing. In one embodiment, a pixel capture sequence having a lowest score is selected.

Embodiments described herein provide a method for use of at least one non-progressive pixel capture sequence during segmented image acquisition, according to various embodiments. A plurality of segments of an image are captured, wherein pixels of each segment of the plurality of segments are captured according to a pixel capture sequence. The pixel capture sequence for at least one segment of the plurality of segments is a non-progressive sequence for controlling a timing difference between pixel capture for proximate pixels of adjacent segments. The image including the plurality of segments is generated.

In one embodiment, the pixel capture sequence for each segment of the plurality of segments is identical. In one embodiment, the pixel capture sequence comprises sequential row-by-row pixel capture proceeding from outer rows of pixels of the segment to inner rows of pixels of the segment.

In another embodiment, a first pixel capture sequence for a first portion of the plurality of segments is different than a second pixel capture sequence for a second portion of the plurality of segments. In one embodiment, the first pixel capture sequence for the first portion of the plurality of segments is inverted (e.g., symmetric about a boundary) relative to the second pixel capture sequence for the second portion of the plurality of segments. In one embodiment, the plurality of segments comprises two rows of segments. In one embodiment, a first row of the two rows of segments comprises the first portion of the plurality of segments and a second row of the two rows of segments comprises the second portion of the plurality of segments, such that the first pixel capture sequence of the first row of segments is inverted relative to the second pixel capture sequence of the second row of segments. In one embodiment, the first pixel capture sequence comprises sequential row-by-row pixel capture proceeding from outer rows of pixels of a segment to inner rows of pixels of the segment. In one embodiment, the first pixel capture sequence comprises a progressive sequence and the second pixel capture sequence comprises an inverted progressive sequence.

In another embodiment, the pixel capture sequence for a segment of the plurality of segments is one of four different pixel capture sequences, wherein the four different pixel capture sequences comprise combinations of inversions of a pixel capture sequence relative to rows and columns of the plurality of segments.

Piezoelectric Micromachined Ultrasonic Transducer (PMUT)

Systems and methods disclosed herein, in one or more aspects provide efficient structures for an acoustic transducer (e.g., a piezoelectric actuated transducer or PMUT). One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details. In other instances, well-known structures and devices are shown in block diagram form in order to facilitate describing the embodiments in additional detail.

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. In addition, the word "coupled" is used herein to mean direct or indirect electrical or mechanical coupling. In addition, the word "example" is used herein to mean serving as an example, instance, or illustration.

FIG. 1A is a diagram illustrating a PMUT device 100 having a center pinned membrane, according to some embodiments. PMUT device 100 includes an interior pinned membrane 120 positioned over a substrate 140 to define a cavity 130. In one embodiment, membrane 120 is attached both to a surrounding edge support 102 and interior support 104. In one embodiment, edge support 102 is connected to an electric potential. Edge support 102 and interior support 104 may be made of electrically conducting materials, such as and without limitation, aluminum, molybdenum, or titanium. Edge support 102 and interior support 104 may also be made of dielectric materials, such as silicon dioxide, silicon nitride or aluminum oxide that have electrical connections the sides or in vias through edge support 102 or interior support 104, electrically coupling lower electrode 106 to electrical wiring in substrate 140.

In one embodiment, both edge support 102 and interior support 104 are attached to a substrate 140. In various embodiments, substrate 140 may include at least one of, and without limitation, silicon or silicon nitride. It should be appreciated that substrate 140 may include electrical wirings and connection, such as aluminum or copper. In one embodiment, substrate 140 includes a CMOS logic wafer bonded to edge support 102 and interior support 104. In one embodiment, the membrane 120 comprises multiple layers. In an example embodiment, the membrane 120 includes lower electrode 106, piezoelectric layer 110, and upper electrode 108, where lower electrode 106 and upper electrode 108 are coupled to opposing sides of piezoelectric layer 110. As shown, lower electrode 106 is coupled to a lower surface of piezoelectric layer 110 and upper electrode 108 is coupled to an upper surface of piezoelectric layer 110. It should be appreciated that, in various embodiments, PMUT device 100 is a microelectromechanical (MEMS) device.

In one embodiment, membrane 120 also includes a mechanical support layer 112 (e.g., stiffening layer) to mechanically stiffen the layers. In various embodiments, mechanical support layer 112 may include at least one of, and without limitation, silicon, silicon oxide, silicon nitride, aluminum, molybdenum, titanium, etc. In one embodiment, PMUT device 100 also includes an acoustic coupling layer 114 above membrane 120 for supporting transmission of acoustic signals. It should be appreciated that acoustic coupling layer can include air, liquid, gel-like materials, or other materials for supporting transmission of acoustic signals. In one embodiment, PMUT device 100 also includes platen layer 116 above acoustic coupling layer 114 for containing acoustic coupling layer 114 and providing a contact surface for a finger or other sensed object with PMUT device 100. It should be appreciated that, in various embodiments, acoustic coupling layer 114 provides a contact surface, such that platen layer 116 is optional. Moreover, it should be appreciated that acoustic coupling layer 114 and/or platen layer 116 may be included with or used in conjunction with multiple PMUT devices. For example, an array of PMUT devices may be coupled with a single acoustic coupling layer 114 and/or platen layer 116.

Figure 1B:
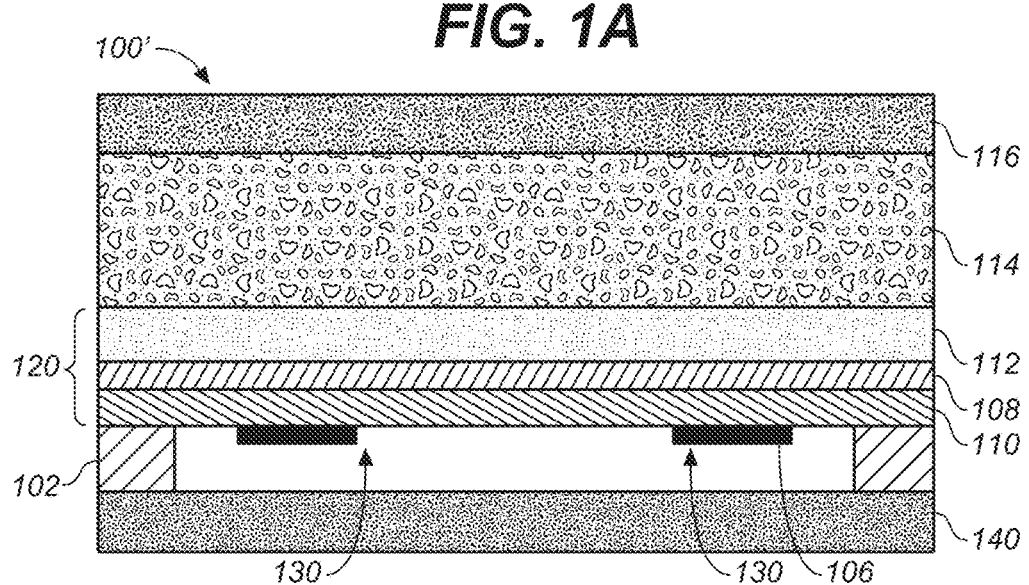
FIG. 1B is a diagram illustrating a PMUT device having an unpinned membrane, according to some embodiments.

FIG. 1B is identical to FIG. 1A in every way, except that the PMUT device 100' of FIG. 1B omits the interior support 104 and thus membrane 120 is not pinned (e.g., is "unpinned"). There may be instances in which an unpinned membrane 120 is desired. However, in other instances, a pinned membrane 120 may be employed.

Figure 2:
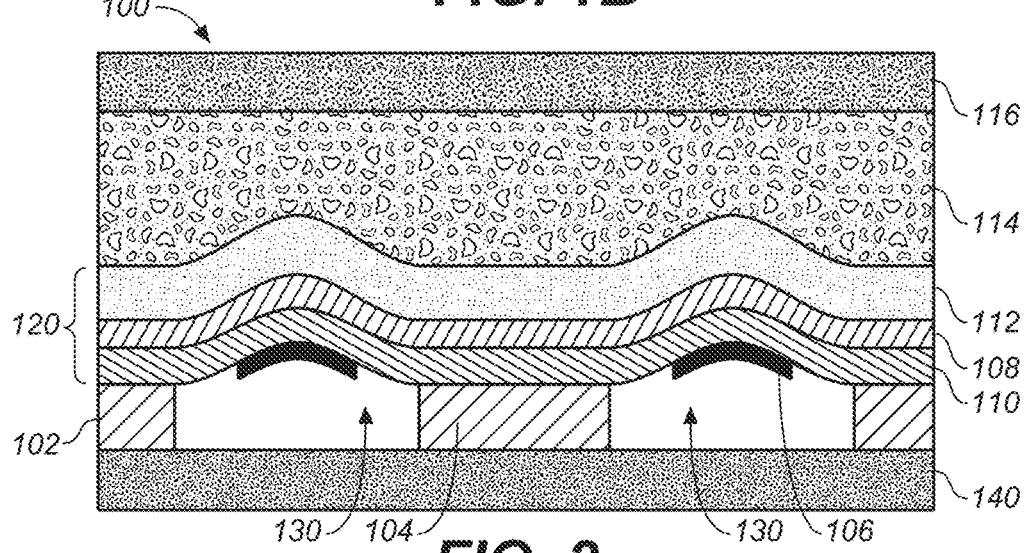
FIG. 2 is a diagram illustrating an example of membrane movement during activation of a PMUT device having a center pinned membrane, according to some embodiments.

FIG. 2 is a diagram illustrating an example of membrane movement during activation of pinned PMUT device 100, according to some embodiments. As illustrated with respect to FIG. 2, in operation, responsive to an object proximate platen layer 116, the electrodes 106 and 108 deliver a high frequency electric charge to the piezoelectric layer 110, causing those portions of the membrane 120 not pinned to the surrounding edge support 102 or interior support 104 to be displaced upward into the acoustic coupling layer 114. This generates a pressure wave that can be used for signal probing of the object. Return echoes can be detected as pressure waves causing movement of the membrane, with compression of the piezoelectric material in the membrane causing an electrical signal proportional to amplitude of the pressure wave.

The described PMUT device 100 can be used with almost any electrical device that converts a pressure wave into mechanical vibrations and/or electrical signals. In one aspect, the PMUT device 100 can comprise an acoustic sensing element (e.g., a piezoelectric element) that generates and senses ultrasonic sound waves. An object in a path of the generated sound waves can create a disturbance (e.g., changes in frequency or phase, reflection signal, echoes, etc.) that can then be sensed. The interference can be analyzed to determine physical parameters such as (but not limited to) distance, density and/or speed of the object. As an example, the PMUT device 100 can be utilized in various applications, such as, but not limited to, fingerprint or physiologic sensors suitable for wireless devices, industrial systems, automotive systems, robotics, telecommunications, security, medical devices, etc. For example, the PMUT device 100 can be part of a sensor array comprising a plurality of ultrasonic transducers deposited on a wafer, along with various logic, control and communication electronics. A sensor array may comprise homogenous or identical PMUT devices 100, or a number of different or heterogenous device structures.

In various embodiments, the PMUT device 100 employs a piezoelectric layer 110, comprised of materials such as, but not limited to, aluminum nitride (AlN), lead zirconate titanate (PZT), quartz, polyvinylidene fluoride (PVDF), and/or zinc oxide, to facilitate both acoustic signal production and sensing. The piezoelectric layer 110 can generate electric charges under mechanical stress and conversely experience a mechanical strain in the presence of an electric field. For example, the piezoelectric layer 110 can sense mechanical vibrations caused by an ultrasonic signal and produce an electrical charge at the frequency (e.g., ultrasonic frequency) of the vibrations. Additionally, the piezoelectric layer 110 can generate an ultrasonic wave by vibrating in an oscillatory fashion that might be at the same frequency (e.g., ultrasonic frequency) as an input current generated by an alternating current (AC) voltage applied across the piezoelectric layer 110. It should be appreciated that the piezoelectric layer 110 can include almost any material (or combination of materials) that exhibits piezoelectric properties, such that the structure of the material does not have a center of symmetry and a tensile or compressive stress applied to the material alters the separation between positive and negative charge sites in a cell causing a polarization at the surface of the material. The polarization is directly proportional to the applied stress and is direction dependent so that compressive and tensile stresses results in electric fields of opposite polarizations.

Further, the PMUT device 100 comprises electrodes 106 and 108 that supply and/or collect the electrical charge to/from the piezoelectric layer 110. It should be appreciated that electrodes 106 and 108 can be continuous and/or patterned electrodes (e.g., in a continuous layer and/or a patterned layer). For example, as illustrated, electrode 106 is a patterned electrode and electrode 108 is a continuous electrode. As an example, electrodes 106 and 108 can be comprised of almost any metal layers, such as, but not limited to, aluminum (Al)/titanium (Ti), molybdenum (Mo), etc., which are coupled with an on opposing sides of the piezoelectric layer 110.

According to an embodiment, the acoustic impedance of acoustic coupling layer 114 is selected to be similar to the acoustic impedance of the platen layer 116, such that the acoustic wave is efficiently propagated to/from the membrane 120 through acoustic coupling layer 114 and platen layer 116. As an example, the platen layer 116 can comprise various materials having an acoustic impedance in the range between 0.8 to 4 Mega Rayleigh (MRayl), such as, but not limited to, plastic, resin, rubber, Teflon, epoxy, etc. In another example, the platen layer 116 can comprise various materials having a high acoustic impedance (e.g., an acoustic impendence greater than 10 MRayl), such as, but not limited to, glass, aluminum-based alloys, sapphire, etc. Typically, the platen layer 116 can be selected based on an application of the sensor. For instance, in fingerprinting applications, platen layer 116 can have an acoustic impedance that matches (e.g., exactly or approximately) the acoustic impedance of human skin (e.g., $1.6 \times 10^6$ Rayl). Further, in one aspect, the platen layer 116 can further include a thin layer of anti-scratch material. In various embodiments, the anti-scratch layer of the platen layer 116 is less than the wavelength of the acoustic wave that is to be generated and/or sensed to provide minimum interference during propagation of the acoustic wave. As an example, the anti-scratch layer can comprise various hard and scratch-resistant materials (e.g., having a Mohs hardness of over 7 on the Mohs scale), such as, but not limited to sapphire, glass, titanium nitride (TiN), silicon carbide (SiC), diamond, etc. As an example, PMUT device 100 can operate at 20 MHz and accordingly, the wavelength of the acoustic wave propagating through the acoustic coupling layer 114 and platen layer 116 can be 70-150 microns. In this example scenario, insertion loss can be reduced and acoustic wave propagation efficiency can be improved by utilizing an anti-scratch layer having a thickness of 1 micron and the platen layer 116 as a whole having a thickness of 1-2 millimeters. It is noted that the term "anti-scratch material" as used herein relates to a material that is resistant to scratches and/or scratch-proof and provides substantial protection against scratch marks.

In accordance with various embodiments, the PMUT device 100 can include metal layers (e.g., aluminum (Al)/ titanium (Ti), molybdenum (Mo), etc.) patterned to form electrode 106 in particular shapes (e.g., ring, circle, square, octagon, hexagon, etc.) that are defined in-plane with the membrane 120. Electrodes can be placed at a maximum strain area of the membrane 120 or placed at close to either or both the surrounding edge support 102 and interior support 104. Furthermore, in one example, electrode 108 can be formed as a continuous layer providing a ground plane in contact with mechanical support layer 112, which can be formed from silicon or other suitable mechanical stiffening material. In still other embodiments, the electrode 106 can be routed along the interior support 104, advantageously reducing parasitic capacitance as compared to routing along the edge support 102.

For example, when actuation voltage is applied to the electrodes, the membrane 120 will deform and move out of plane. The motion then pushes the acoustic coupling layer 114 it is in contact with and an acoustic (ultrasonic) wave is generated. Oftentimes, vacuum is present inside the cavity 130 and therefore damping contributed from the media within the cavity 130 can be ignored. However, the acoustic coupling layer 114 on the other side of the membrane 120 can substantially change the damping of the PMUT device 100. For example, a quality factor greater than 20 can be observed when the PMUT device 100 is operating in air with atmosphere pressure (e.g., acoustic coupling layer 114 is air) and can decrease lower than 2 if the PMUT device 100 is operating in water (e.g., acoustic coupling layer 114 is water).

Figure 3:
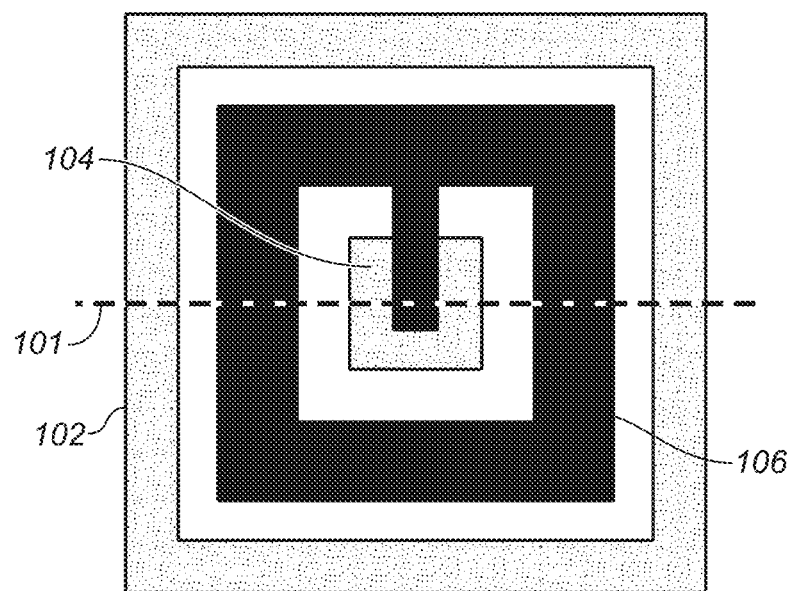
FIG. 3 is a top view of the PMUT device of FIG. 1A, according to some embodiments.

FIG. 3 is a top view of the PMUT device 100 of FIG. 1A having a substantially square shape, which corresponds in part to a cross section along dotted line 101 in FIG. 3. Layout of surrounding edge support 102, interior support 104, and lower electrode 106 are illustrated, with other continuous layers not shown. It should be appreciated that the term "substantially" in "substantially square shape" is intended to convey that a PMUT device 100 is generally square-shaped, with allowances for variations due to manufacturing processes and tolerances, and that slight deviation from a square shape (e.g., rounded corners, slightly wavering lines, deviations from perfectly orthogonal corners or intersections, etc.) may be present in a manufactured device. While a generally square arrangement PMUT device is shown, alternative embodiments including rectangular, hexagon, octagonal, circular, or elliptical are contemplated. In other embodiments, more complex electrode or PMUT device shapes can be used, including irregular and non-symmetric layouts such as chevrons or pentagons for edge support and electrodes.

Figure 4:
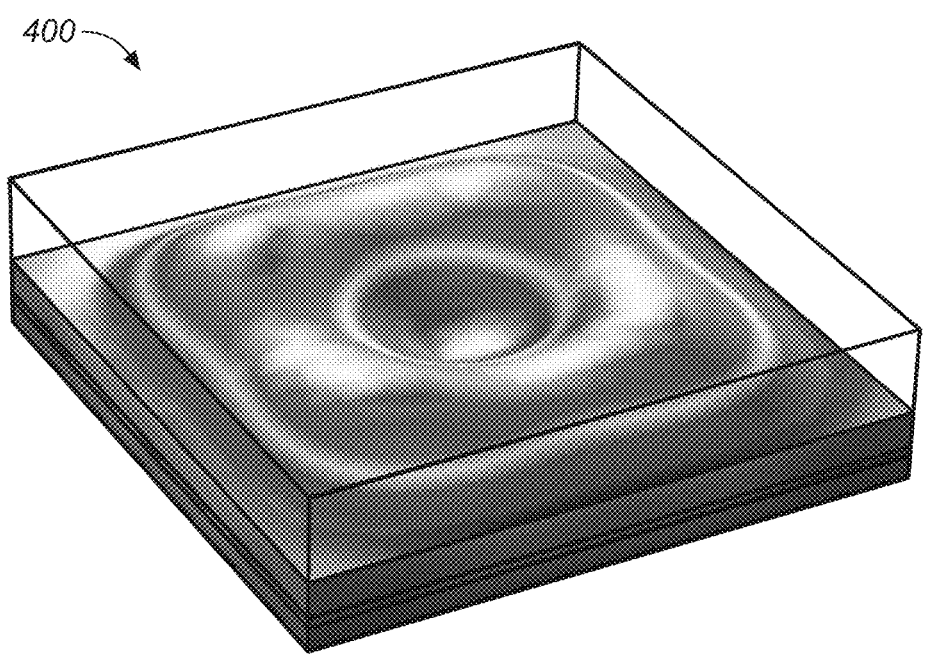
FIG. 4 is a simulated map illustrating maximum vertical displacement of the membrane of the PMUT device shown in FIGS. 1A, 2, and 3, according to some embodiments.

FIG. 4 is a simulated topographic map 400 illustrating maximum vertical displacement of the membrane 120 of the PMUT device 100 shown in FIGS. 1A-3. As indicated, maximum displacement generally occurs along a center axis of the lower electrode, with corner regions having the greatest displacement. As with the other figures, FIG. 4 is not drawn to scale with the vertical displacement exaggerated for illustrative purposes, and the maximum vertical displacement is a fraction of the horizontal surface area comprising the PMUT device 100. In an example PMUT device 100, maximum vertical displacement may be measured in nanometers, while surface area of an individual PMUT device 100 may be measured in square microns.

Figure 5:
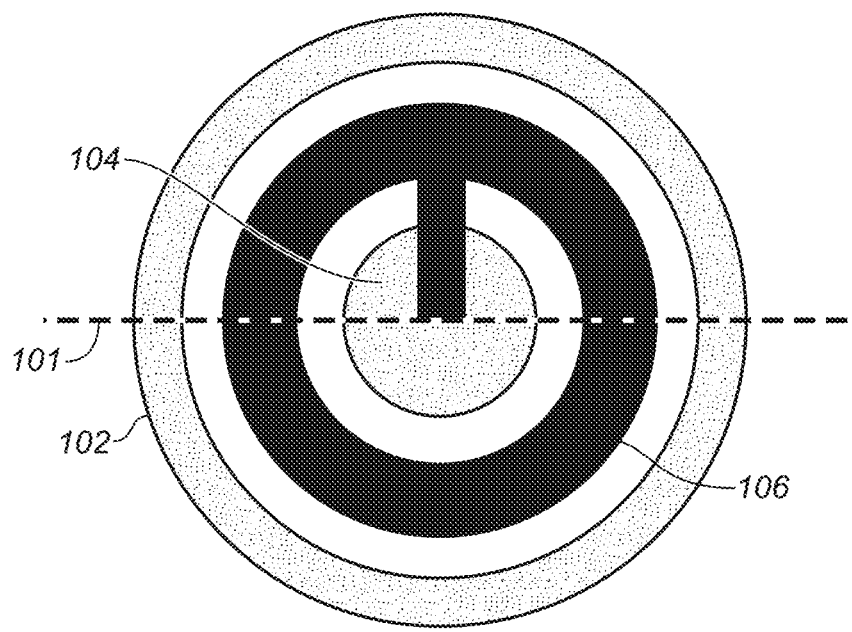
FIG. 5 is a top view of an example PMUT device having a circular shape, according to some embodiments.

FIG. 5 is a top view of another example of the PMUT device 100 of FIG. 1A having a substantially circular shape, which corresponds in part to a cross section along dotted line 101 in FIG. 5. Layout of surrounding edge support 102, interior support 104, and lower electrode 106 are illustrated, with other continuous layers not shown. It should be appreciated that the term "substantially" in "substantially circular shape" is intended to convey that a PMUT device 100 is generally circle-shaped, with allowances for variations due to manufacturing processes and tolerances, and that slight deviation from a circle shape (e.g., slight deviations on radial distance from center, etc.) may be present in a manufactured device.

Figure 6:
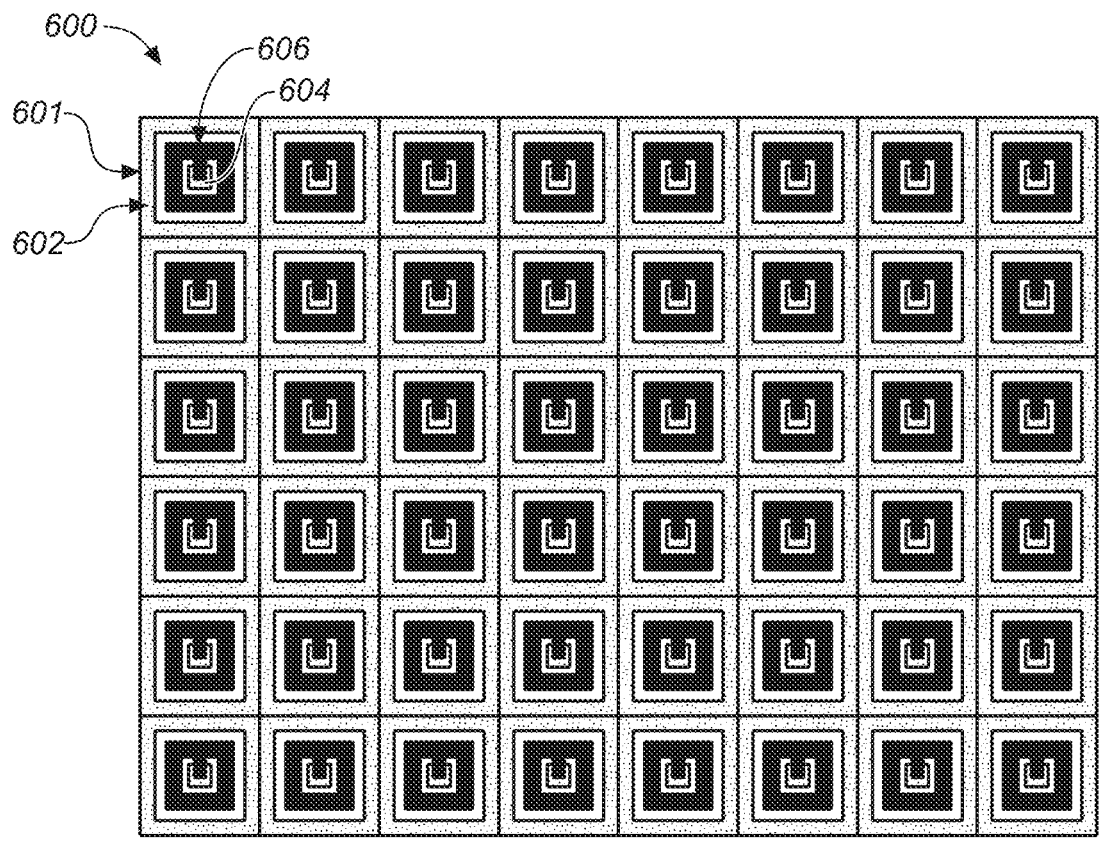
FIG. 6 illustrates an example array of square-shaped PMUT devices, according to some embodiments.

FIG. 6 illustrates an example two-dimensional array 600 of square-shaped PMUT devices 601 formed from PMUT devices having a substantially square shape similar to that discussed in conjunction with FIGS. 1A, 1B, 2, and 3. Layout of square surrounding edge support 602, interior support 604, and square-shaped lower electrode 606 surrounding the interior support 604 are illustrated, while other continuous layers are not shown for clarity. As illustrated, array 600 includes columns of square-shaped PMUT devices 601 that are in rows and columns. It should be appreciated that rows or columns of the square-shaped PMUT devices 601 may be offset. Moreover, it should be appreciated that square-shaped PMUT devices 601 may contact each other or be spaced apart. In various embodiments, adjacent square-shaped PMUT devices 601 are electrically isolated. In other embodiments, groups of adjacent square-shaped PMUT devices 601 are electrically connected, where the groups of adjacent square-shaped PMUT devices 601 are electrically isolated.

In operation, during transmission, selected sets of PMUT devices in the two-dimensional array can transmit an acoustic signal (e.g., a short ultrasonic pulse) and during sensing, the set of active PMUT devices in the two-dimensional array can detect an interference of the acoustic signal with an object (in the path of the acoustic wave). The received interference signal (e.g., generated based on reflections, echoes, etc. Of the acoustic signal from the object) can then be analyzed. As an example, an image of the object, a distance of the object from the sensing component, a density of the object, a motion of the object, etc., can all be determined based on comparing a frequency and/or phase of the interference signal with a frequency and/or phase of the acoustic signal. Moreover, results generated can be further analyzed or presented to a user via a display device (not shown).

Figure 7A:
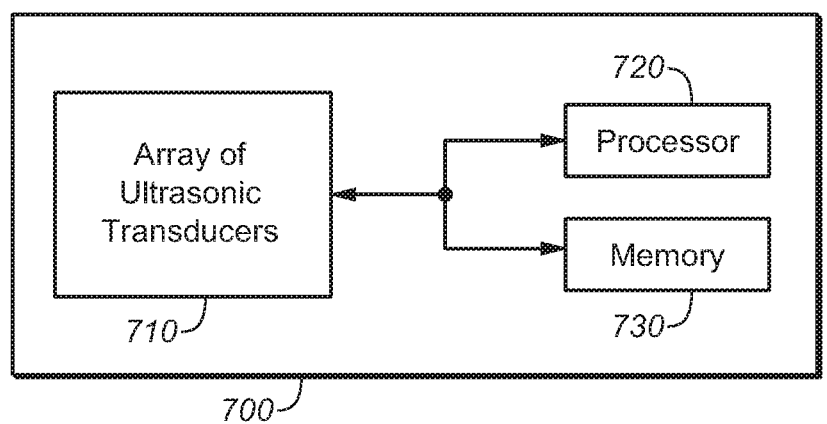
FIG. 7A illustrates an example fingerprint sensor, in accordance with various embodiments.

FIG. 7A illustrates an example fingerprint sensor 700, in accordance with various embodiments. In one embodiment, fingerprint sensor 700 includes an array 710 of ultrasonic transducers (e.g., PMUT devices), a processor 720, and a memory 730. In various embodiments, processor 720 performs certain operations in accordance with instructions stored within memory 730. It should be appreciated that components of fingerprint sensor 700 are examples, and that certain components, such as processor 720 and/or memory 730 may not be located within fingerprint sensor 700. For example, system circuitry of an electronic device including fingerprint sensor 700 may include a processor and/or memory for performing certain operations.

In one embodiment, fingerprint sensor 700 includes processor 720 for performing the pixel capture, where pixel capture is performed using subsets of ultrasonic transducers (e.g., PMUTs) of fingerprint sensor 700. In other embodiments, processor 720 can perform at least some signal analysis, e.g., thresholding, to determine whether an object has interacted with fingerprint sensor 700. In other embodiments, processor 720 can analyze captured pixels and determine whether the object has characteristics of finger, e.g., a pattern resembling the ridge/valley pattern of a fingerprint. In other embodiments, processor 720 can capture an image of the fingerprint and forward it to a processor of system circuitry for further analysis.

While the embodiment of FIG. 7A includes processor 720 and memory 730, as described above, it should be appreciated that various functions of processor 720 and memory 730 may reside in other components of the electronic device within which fingerprint sensor 700 resides (e.g., within always-on circuitry or system circuitry). Moreover, it should be appreciated that processor 720 may be any type of processor for performing any portion of the described functionality (e.g., custom digital logic).

In various embodiments, fingerprint sensor 700 can include ultrasonic transducers (e.g., PMUTs) able to generate and detect acoustic/pressure waves. Examples of PMUT devices and arrays of PMUT devices are described in accordance with FIGS. 1A-6 above. In embodiments, a device includes fingerprint sensor 700 comprised of an array of ultrasonic transducers that can facilitate ultrasonic signal generation and sensing. For example, fingerprint sensor 700 can include a silicon wafer having a two-dimensional (or one-dimensional) array of ultrasonic transducers.

Figure 7B:
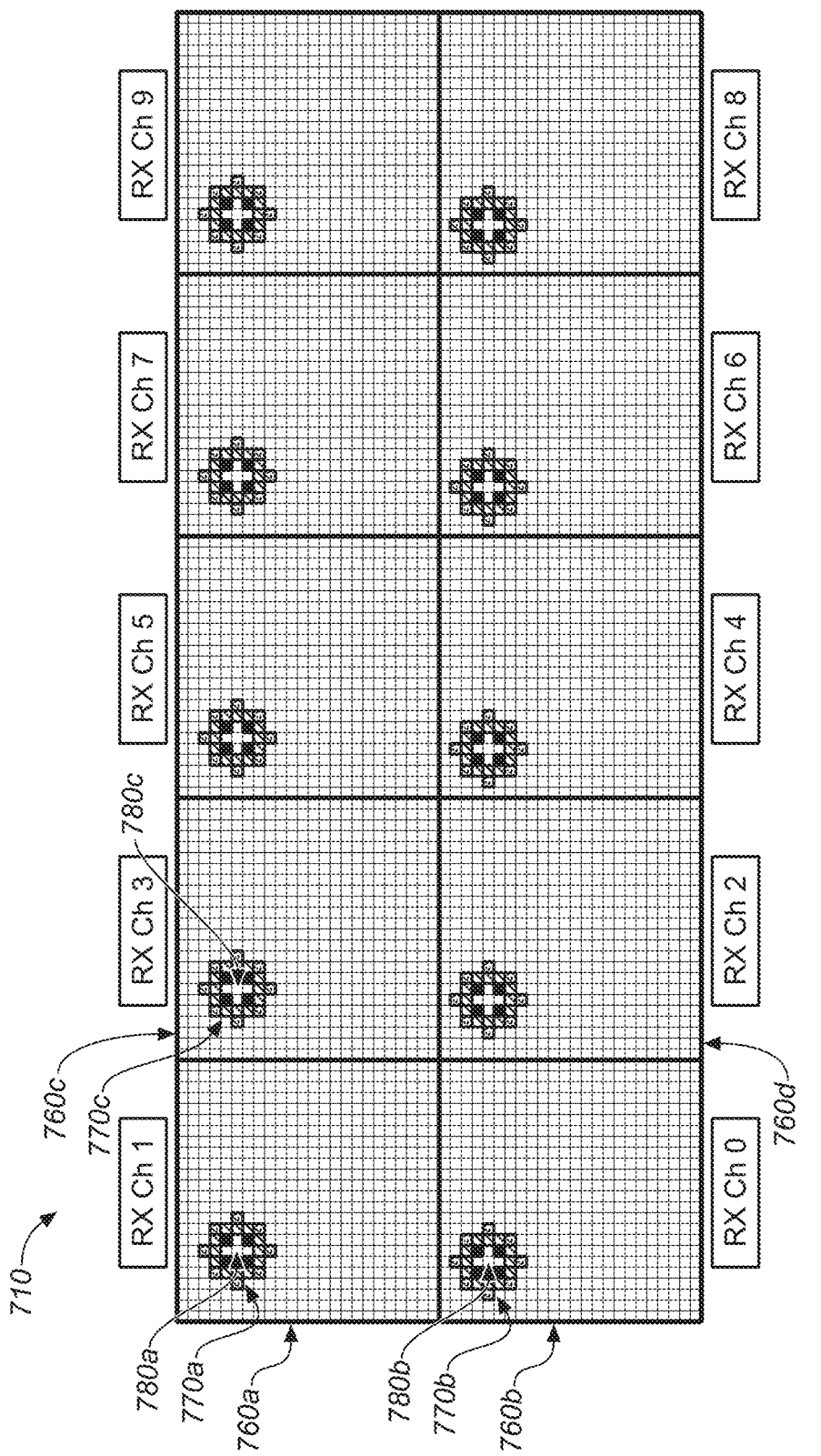
FIG. 7B illustrates example concurrent operation of pixel capture for a multiple array positions in a two-dimensional array of ultrasonic transducers, according to some embodiments.

FIG. 7B illustrates example concurrent operation of pixel capture for a multiple array positions in a two-dimensional array 710 of ultrasonic transducers, according to some embodiments. A beamforming pattern is defined for two-dimensional array 710. In the illustrated example, two-dimensional array 710 is 50×125 ultrasonic transducers, separated into ten identical 25×25 segments 760 (four of which are illustrated as sub-blocks 760a-d). When a sequence of activation to generate an ultrasound beam and sensing reflected echoes is completed, the beamforming pattern (e.g., beamforming patterns 770a, 770b, and 770c) is moved according to a pixel capture sequence (e.g., rightward or leftward, or upward and downward), with respect to the two-dimensional array 710 of ultrasonic transducers, and the sequence is repeated until all (or a specified amount) of pixels have been imaged. As the beamforming pattern moves, so does the receive pattern of ultrasonic transducers activated during a receive operation (e.g., receive patterns 780a, 780b, and 780c).

It should be appreciated that any type of pixel capture sequence may be used (e.g., side-to-side, top-to-bottom, random, another predetermined order, row and/or column skipping, etc.) Moreover, it should be appreciated that FIG. 7B illustrates a phase delay pattern that is symmetric about a focal point of the transmitting pixels. Once a beamforming space has been defined to designate which ultrasonic transducers in the beamforming space will be used for transmission of ultrasonic signals (e.g., the beamforming pattern), for receipt of reflected ultrasonic signals (e.g., the receive pattern), or for nothing (remain inactive), the ultrasonic sensor programs the transmit beamforming pattern and receive beamforming pattern into at least one location within the ultrasonic transducer array.

In one embodiment, an array controller (e.g., an array engine, array control logic) and array control shift register logic of the ultrasonic sensor programs this transmit beamforming pattern and receive pattern onto a plurality of locations within the ultrasonic transducer array. For example, with reference to FIG. 7B, the beamforming pattern is programmed at corresponding locations within each of the ten ultrasonic array sub-blocks so that up to ten image pixels can be captured in each transmit/received (TX/RX) operation, one pixel from each of the ten ultrasonic array sub-blocks. Imaging over the entire sensor area is then accomplished by stepping the beamforming patterns over the entire ultrasonic transducer array, transmitting and receiving at each step to capture a corresponding image pixel, where each sub-block corresponds to a segment of the image.

Example Segmented Image Acquisition

Embodiments described herein provide methods and systems for segmented image acquisition at a sensor. In some embodiments, the sensor is an ultrasonic sensor. In other embodiments, the sensor is an optical sensor. In other embodiments, the sensor is a capacitive sensor. A plurality of segments of an image are captured concurrently. Pixels of each segment of the plurality of segments are captured according to a pixel capture sequence. The pixel capture sequence for at least one segment of the plurality of segments is a non-progressive sequence for controlling a timing difference between pixel capture for proximate pixels of adjacent segments. An image comprising the plurality of segments is generated.

Conventional imaging sensors capture pixels in a raster scan order, e.g., left-to-right across a row of pixels from top-to-bottom over the scanned area in consecutive order. As the imaging area of a conventional imaging sensors grows, the time required for image acquisition grows as well. To improve image acquisition time, improved imaging sensors in accordance with the described embodiments, such as an ultrasonic fingerprint sensor, provide for parallelization of pixel acquisition. An advantage of segmented image acquisition is that by capturing various segments concurrently the overall time required to capture a complete sensor image is reduced. Concurrent capturing and processing of the image segment enables an increase acquisition and processing time per pixel, while maintaining a constant total image capture time. Reduced image acquisition time may also help increase a framerate when a series of images needs to be captured in sequence. In some embodiments, the parallel pixel acquisition is segmented image acquisition, in which segments of the complete image are captured concurrently (e.g., in parallel), improving the speed of image acquisition. The segments are captured concurrently, while pixels within each segment are captured according to a pixel capture sequence.

During segmented or tiled image acquisition, if an object being imaged moves during the image acquisition, artifacts may be generated at the contiguous boundary between adjacent segments of the image. The artifacts are generated because of the timing differences between the pixels captured at the contiguous boundary. For example, during fingerprint acquisition at an imaging sensor, a ridge pattern on edges of segments might not be aligned, resulting in problems with an image matcher and authentication, impacting performance of the of the fingerprint sensor. Therefore, embodiments described herein seek to reduce boundary artifacts, and as such, increase performance of the sensor.

Embodiments described herein provide a method for determining at least one pixel capture sequence for use in segmented image acquisition of at sensor. Embodiments described herein provide improved image capture during segmented image acquisition by reducing the impact of artifact generation caused by timing differences between edge pixels of adjacent segments. Embodiments described herein provide for segmented image acquisition, where a plurality of segments of the image are captured concurrently. Pixels of each segment are captured according to a pixel capture sequence, such that a timing difference between pixel capture for adjacent edge pixels at the contiguous boundary of adjacent segments is minimized. In one embodiment, at least one pixel capture sequence for segments of an image is determined for minimizing timing differences between adjacent edge pixels of adjacent segments.

Figure 8:
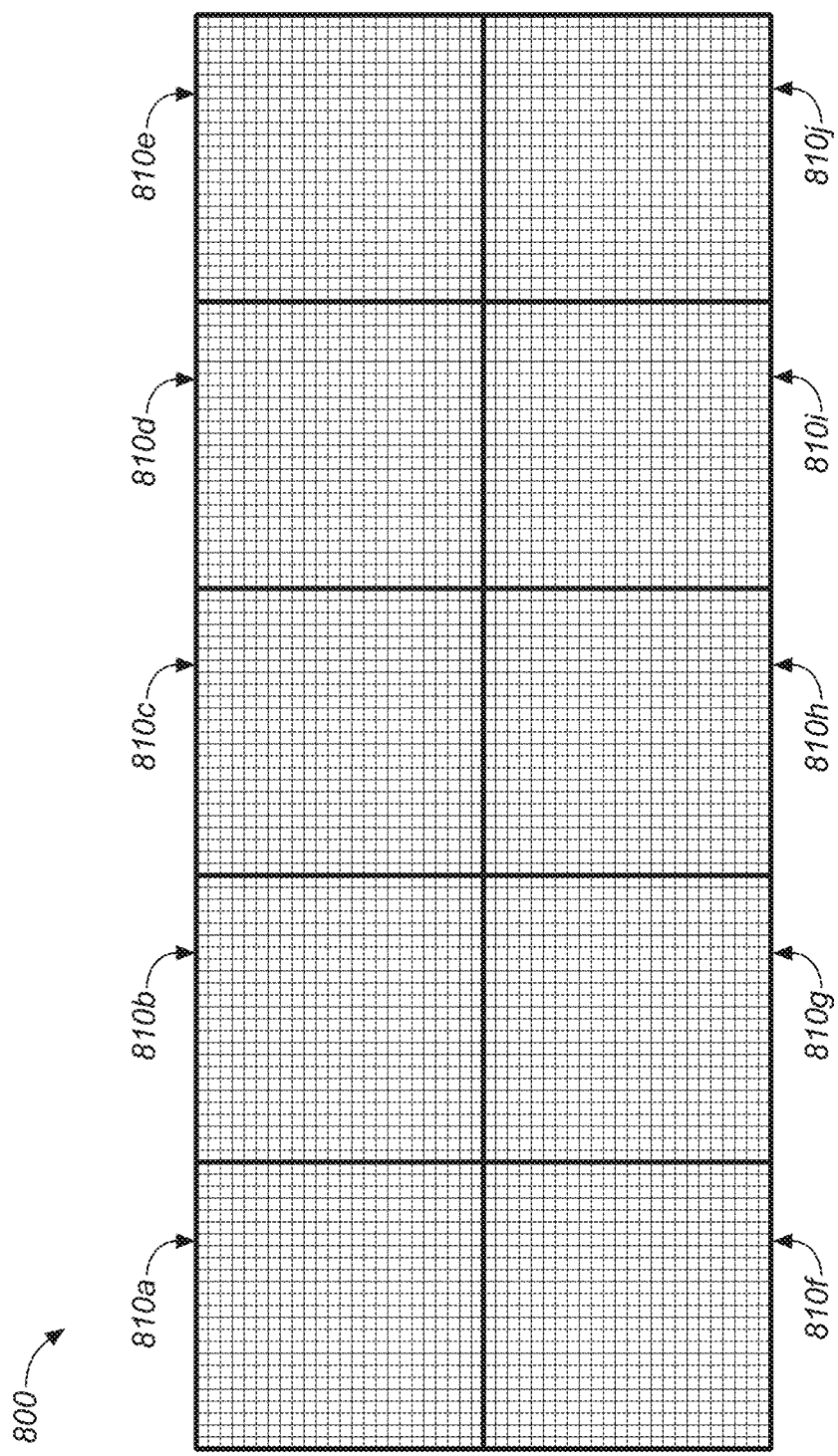
FIG. 8 illustrates an example image including concurrently captured segments, in accordance with various embodiments.

With reference to FIG. 8, an example image 800 including concurrently captured segments 810a-j is shown. As illustrated, each segment 810a-j includes 25×25 pixels. It should be appreciated that segments in accordance with the described embodiments can include any number of pixels, and that the segments can be any shape or size, and need not be square. For example, segments may be rectangles including 23×27 pixels. Moreover, in some embodiments, segments can be non-quadrilateral (e.g., hexagon), It should be further appreciated that an image can include any number of segments.

As utilized herein, segments of an image refer to portions of an image captured concurrently that, when captured, comprise the complete image. In some embodiments, segments are non-overlapping contiguous portions of the image. As illustrated in FIG. 8, image 800 includes ten adjacent segments 810a-j. In some embodiments, segments may have an overlap with contiguous segments.

A sensor device (e.g., an ultrasonic sensor or an image sensor) is configured to capture image 800. For example, an ultrasonic sensor may perform pixel capture by activating subsets of ultrasonic transducers for capturing single pixels (e.g., beam forming). During segmented image acquisition, multiple pixels are captured concurrently. In some embodiments, one pixel is captured at a time per segment. It should be appreciated that in some embodiments, more than one pixel may be captured at a time per segment, dependent on the hardware configuration of the sensor. As described herein, a segment is a portion of an image in which one pixel is captured at a time, where pixels are captured within a segment according to a pixel capture sequence.

Figure 9:
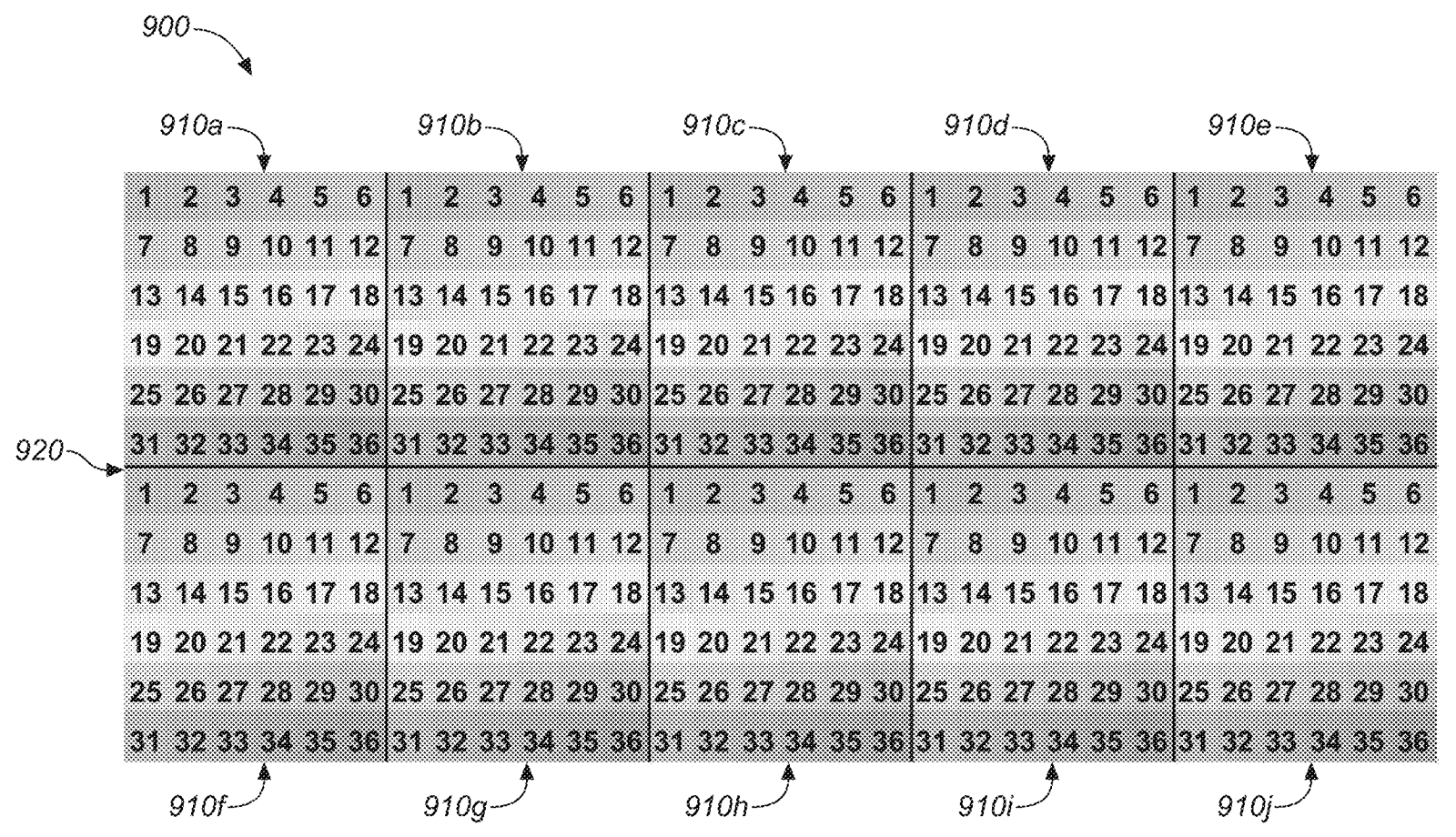

FIG. 9 illustrates an example use of a progressive pixel capture sequence for all segments of image 900. As illustrated, each segment 900a-j of image 900 includes 6×6 pixels, where the numbers 1 through 36 indicate the ordering of the pixel capture sequence for each segment. The pixel capture sequence of each segment 910a-j of FIG. 9 is progressive, where progressive is defined herein as proceeding from pixel 1 through pixel 36 in a linear fashion, pixel by pixel and row by row. For instance, the pixel capture sequence proceeds from pixel 1 to pixel 6 of the first row, then proceeds to the second row from pixel 7 to pixel 12, proceeding through the rows in a linear fashion until completing pixel capture at the sixth row, from pixel 31 through pixel 36.

In some embodiments, pixel capture within a pixel capture sequence proceeds at a constant rate, e.g. pixel 1 for each segment is captured concurrently. Pixel capture for each segment, as each pixel is capture sequentially, spans a pixel capture time period and can be linked to the framerate. For example, pixel capture of all pixels for each segment may take 5-50 milliseconds. As such, there may be a 5-50 millisecond difference in pixel capture time between pixel 1 and pixel 36 of each segment. In the illustrated example, the sixth row of pixels of segments 910a-e is adjacent to the first row of pixels of segments 910f-j at boundary 920. As shown in FIG. 9, pixel 31 of segments 910a-e is adjacent to pixel 1 of 910f-j at boundary 920. Depending on the imaging rate, there may be a several millisecond (or greater) difference in pixel capture time between pixels 31 through 36 of segments 910a-e and pixels 1 through 6 of 910f-j.

This time difference is significant where an object being imaged (e.g., a finger for capturing a fingerprint) moves during image acquisition, as the captured image may be distorted at the boundary, creating an artifact at the boundary. During fingerprint acquisition, these artifacts may cause a misalignment between a ridge pattern of the fingerprint, resulting in problems with an image matcher and authentication, thereby impacting performance of the of the fingerprint sensor.

Embodiments described herein provide methods and systems for determining a pixel capture sequence in segmented image acquisition of a sensor. Sensors as described herein include hardware for performing segmented image capture, where pixels of a plurality of segments are captured concurrently. The hardware can differ. For example, as described above, the sensor can include any number of segments of any shape or size for imaging any number of pixels. Each segment shares a contiguous boundary with one or more adjacent segments. Embodiments herein provide methods for minimizing timing differences between pixel capture for pixels of adjacent segments sharing a contiguous boundary.

In some embodiments, a minimization under constraints is performed in order to find a solution set with the smallest artifact. For example, in some embodiments, a plurality of pixel capture sequences for capturing segments of an image at a sensor using segmented image acquisition are received, where the pixel capture sequences are in accordance with electronic constraints of the sensor. A timing difference between a pixel capture operation for proximate pixels of adjacent segments during the segmented image acquisition is determined. In some embodiments, a timing difference between a pixel capture operation for proximate pixels within a segment can also be considered and determined. It should be appreciated that the pixel capture sequence selection can consider the timing difference between any proximate or adjacent pixels of the image. A score based on the timing differences, for example based at least in part on a summation of the timing differences for proximate pixels of adjacent segments, is determined. The scores are compared, and a pixel capture sequence is selected based on the comparison of the scores.

Figure 10:
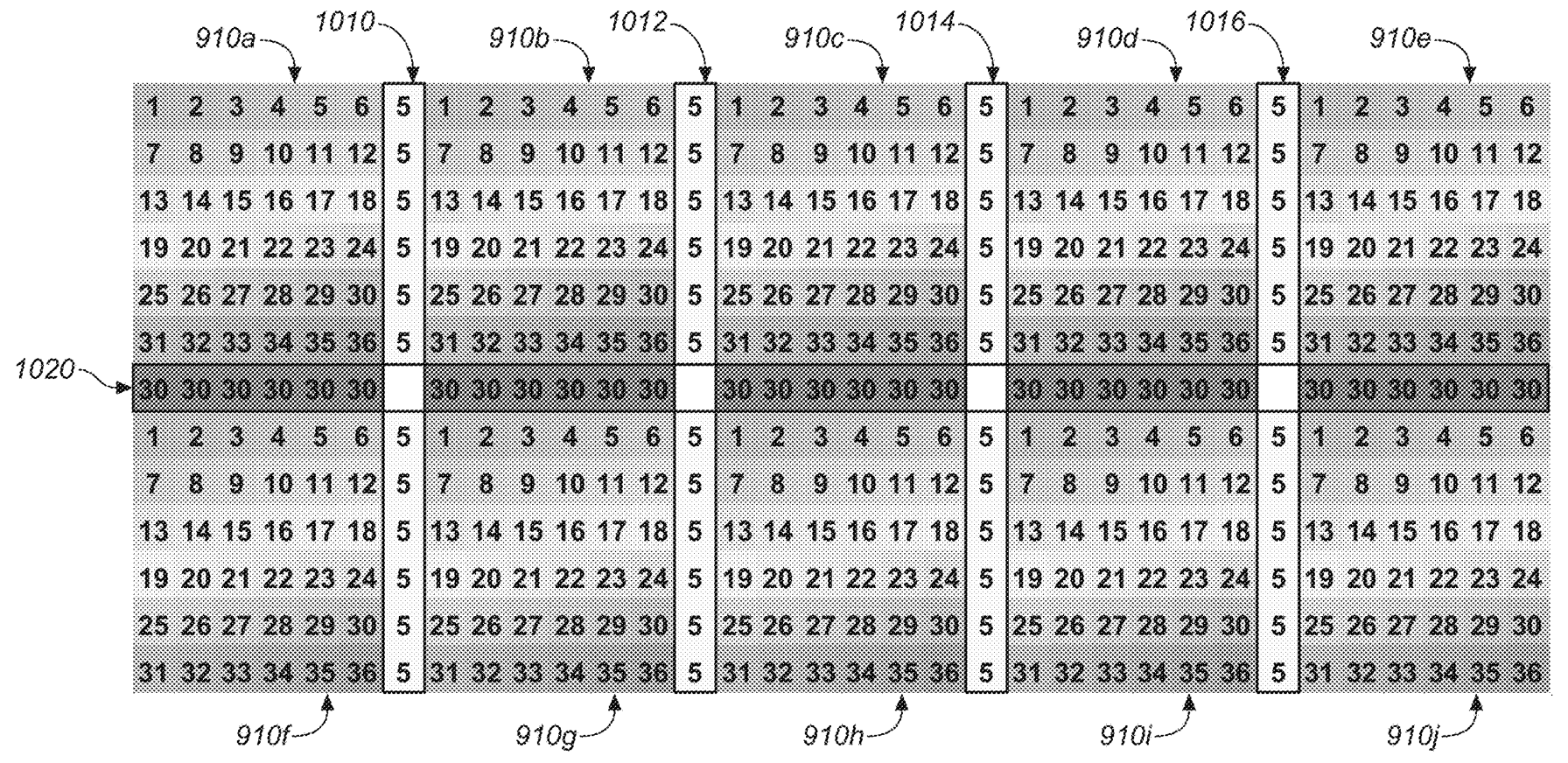

FIG. 10 illustrates an example scoring of the pixel capture sequence of image 900 of FIG. 9. As illustrated; scoring in this example is a summation of timing differences between a pixel capture operation for adjacent pixels of adjacent segments at a contiguous boundary during the segmented image acquisition. FIG. 10 illustrates an example progressive pixel capture sequence, where each segment performs pixel capture using the progressive pixel capture sequence. Scoring column 1010 illustrates a score between adjacent pixels of segment 910a to segment 910b and adjacent pixels of segment 910f and segment 910g, scoring column 1012 illustrates a score between adjacent pixels of segment 910b to segment 910c and adjacent pixels of segment 910g and segment 910h, scoring column 1014 illustrates a score between adjacent pixels of segment 910c to segment 910d and adjacent pixels of segment 910h and segment 910i, and scoring column 1016 illustrates a score between adjacent pixels of segment 910d to segment 910e and adjacent pixels of segment 910i and segment 910j. Scoring row 1020 illustrates a score between adjacent pixels of segment 910a to segment 910f, adjacent pixels of segment 910b and segment 910g, adjacent pixels of segment 910c and segment 910h, adjacent pixels of segment 910d and segment 910i, and adjacent pixels of segment 910e and segment 910j. It should be appreciated that scoring columns 1010, 1012, 1014, and 1016, and scoring row 1020 are illustrative of scores only, and are not included within image 900.

As illustrated in FIG. 10, scoring columns 1010, 1012, 1014, and 1016 show that there is a timing difference of 5 (e.g., 6 minus 1, 12 minus 7, etc.) between each adjacent pixel of adjacent segments at the contiguous boundary between the segments. Scoring row 1020 shows that there is a timing difference of 30 (e.g., 31 minus 1, 32 minus 2, etc.) between each adjacent pixel of adjacent segments at the contiguous boundary between the segments. A summation of the timing differences illustrated in scoring columns 1010, 1012, 1014, and 1016, and scoring row 1020 is 1140.

Figure 11:
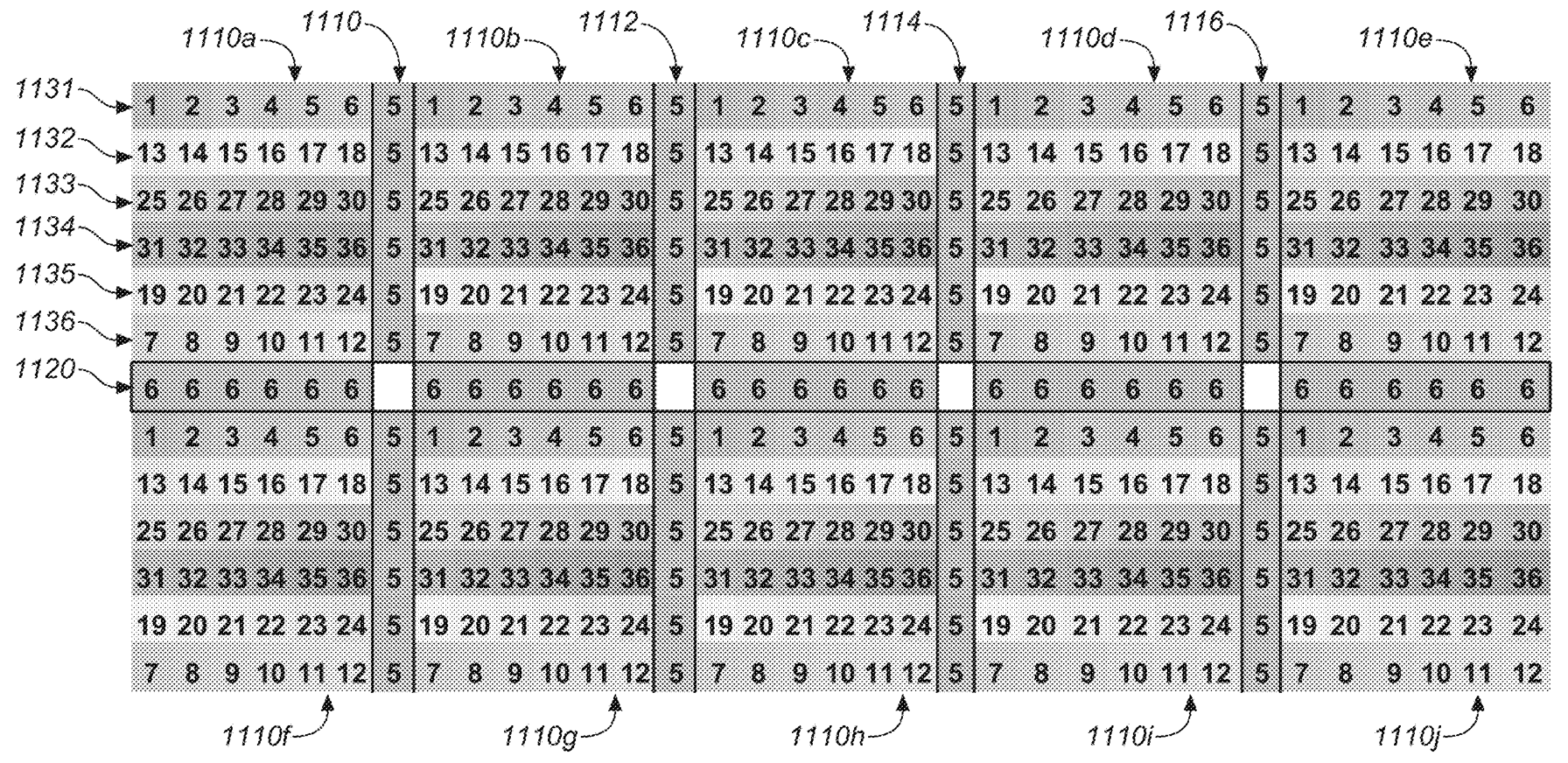

FIG. 11 illustrates an example scoring for an image including concurrently captured segments using a non-progressive pixel capture sequence, according to an embodiment. As described above, scoring is a summation of timing differences between a pixel capture operation for adjacent pixels of adjacent segments at a contiguous boundary during the segmented image acquisition. FIG. 11 illustrates an example non-progressive pixel capture sequence where each segment uses the same non-progressive pixel capture sequence, wherein the pixel capture sequence comprises sequential row-by-row pixel capture proceeding from outer rows of pixels of the segment to inner rows of pixels of the segment. As used herein, "outer" refers to rows at or closer to the outer edges of the image and "inner" refers to rows at or closer to the interior of the image. As illustrated, with reference to segment 1110a, pixel capture proceeds pixel-by-pixel across the row 1131 (top row) from left to right, then proceeds to row 1136 (bottom row) from left to right, then proceeds to row 1132 from left to right, then proceeds to row 1135 from left to right, then proceeds to row 1133 from left to right, and finally proceeds to row 1134 from left to right. While the illustrated pixel capture sequence includes sequential pixel capture within each row (e.g., left to right), it should be appreciated that any other order (e.g., right to left, non-sequential, etc.) may be used. Moreover, it should be appreciated that rows can use different ordering of pixel capture.

Scoring column 1110 illustrates a score between adjacent pixels of segment 1110a to segment 1110b and adjacent pixels of segment 1110f and segment 1110g, scoring column 1112 illustrates a score between adjacent pixels of segment 1110b to segment 1110c and adjacent pixels of segment 1110g and segment 1110h, scoring column 1114 illustrates a score between adjacent pixels of segment 1110c to segment 1110d and adjacent pixels of segment 1110h and segment 1110i, and scoring column 1116 illustrates a score between adjacent pixels of segment 1110d to segment 1110e and adjacent pixels of segment 1110i and segment 1110j. Scoring row 1120 illustrates a score between adjacent pixels of segment 1110a to segment 1110f, adjacent pixels of segment 1110b and segment 1110g, adjacent pixels of segment 1110c and segment 1110h, adjacent pixels of segment 1110d and segment 1110i, and adjacent pixels of segment 1110e and segment 1110j. It should be appreciated that scoring columns 1110, 1112, 1114, and 1116, and scoring row 1120 are illustrative of scores only, and are not included within an image.

As illustrated in FIG. 11, scoring columns 1110, 1112, 1114, and 1116 show that there is a timing difference of 5 (e.g., 6 minus 1, 12 minus 7, etc.) between each adjacent pixel of adjacent segments at the contiguous boundary between the segments. Scoring row 1120 shows that there is a timing difference of 6 between each adjacent pixel of adjacent segments at the contiguous boundary between the segments. A summation of the timing differences illustrated in scoring columns 1110, 1112, 1114, and 1116, and scoring row 1120 is 420. It should be appreciated that adjacent pixels of adjacent rows 1131, 1132, and 1133, and adjacent pixels of adjacent rows 1134, 1135, and 1136 have a timing difference of 12 (e.g., 13 minus 1, 34 minus 22, etc.) In some embodiments, the timing difference of adjacent pixels of adjacent rows within a segment can also be determined and used for determining a scoring for a pixel capture sequence.

Figure 12:
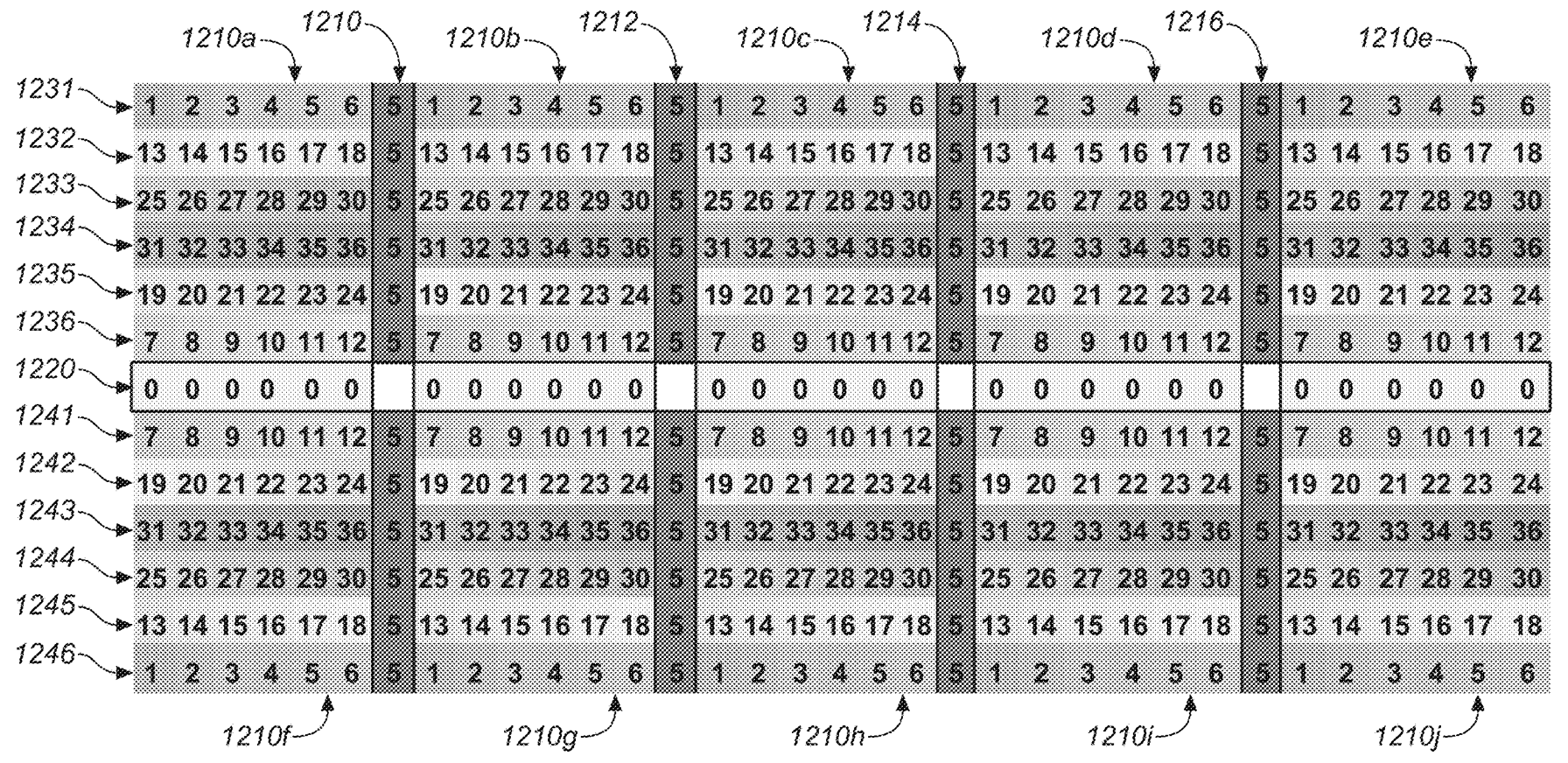

FIG. 12 illustrates an example scoring for an image including concurrently captured segments using a plurality of non-progressive pixel capture sequences, according to an embodiment. As described above, scoring is a summation of timing differences between a pixel capture operation for adjacent pixels of adjacent segments at a contiguous boundary during the segmented image acquisition. FIG. 12 illustrates two example non-progressive pixel capture sequences where segments 1210a through 1210e use a first non-progressive pixel capture sequence and segments 1210f through 1210j use a second non-progressive pixel capture sequence. In the illustrated embodiment, the first non-progressive pixel capture sequence is inverted (e.g., symmetric about a boundary between rows 1236 and 1241) relative to the second non-progressive pixel capture sequence, where the pixel capture sequences start at the outer row of the image. While the illustrated pixel capture sequence includes sequential pixel capture within each row (e.g., left to right), it should be appreciated that any other order (e.g., right to left, non-sequential, etc.) may be used. Moreover, it should be appreciated that rows can use different ordering of pixel capture.

The non-progressive pixel capture sequence of segments 1210a through 1210e is the same pixel capture sequence illustrated in FIG. 11, where the pixel capture sequence comprises sequential row-by-row pixel capture proceeding from outer rows of pixels of the segment to inner rows of pixels of the segment starting from the top row. As illustrated, with reference to segment 1210a, pixel capture proceeds pixel-by-pixel across the row 1231 (top row) from left to right, then proceeds to row 1236 (bottom row) from left to right, then proceeds to row 1232 from left to right, then proceeds to row 1235 from left to right, then proceeds to row 1233 from left to right, and finally proceeds to row 1234 from left to right.

The non-progressive pixel capture sequence of segments 1210f through 1210j is an inversion of pixel capture sequence used in segments 1210a through 1210e, where the pixel capture sequence comprises sequential row-by-row pixel capture proceeding from outer rows of pixels of the segment to inner rows of pixels of the segment starting from the bottom row. As illustrated, with reference to segment 1210f, pixel capture proceeds pixel-by-pixel across the row 1246 (bottom row) from left to right, then proceeds to row 1241 (top row) from left to right, then proceeds to row 1245 from left to right, then proceeds to row 1242 from left to right, then proceeds to row 1244 from left to right, and finally proceeds to row 1243 from left to right.

Scoring column 1210 illustrates a score between adjacent pixels of segment 1210a to segment 1210b and adjacent pixels of segment 1210f and segment 1210g, scoring column 1212 illustrates a score between adjacent pixels of segment 1210b to segment 1210c and adjacent pixels of segment 1210g and segment 1210h, scoring column 1214 illustrates a score between adjacent pixels of segment 1210c to segment 1210d and adjacent pixels of segment 1210h and segment 1210i, and scoring column 1216 illustrates a score between adjacent pixels of segment 1210d to segment 1210e and adjacent pixels of segment 1210i and segment 1210j. Scoring row 1220 illustrates a score between adjacent pixels of segment 1210a to segment 1210f, adjacent pixels of segment 1210b and segment 1210g, adjacent pixels of segment 1210c and segment 1210h, adjacent pixels of segment 1210d and segment 1210i, and adjacent pixels of segment 1210e and segment 1210j. It should be appreciated that scoring columns 1210, 1212, 1214, and 1216, and scoring row 1220 are illustrative of scores only, and are not included within an image.

As illustrated in FIG. 12, scoring columns 1210, 1212, 1214, and 1216 show that there is a timing difference of 5 (e.g., 6 minus 1, 12 minus 7, etc.) between each adjacent pixel of adjacent segments at the contiguous boundary between the segments. Scoring row 1220 shows that there is a timing difference of zero (0) between each adjacent pixel of adjacent segments at the contiguous boundary between the segments. A summation of the timing differences illustrated in scoring columns 1210, 1212, 1214, and 1216, and scoring row 1220 is 240.

Figure 13:
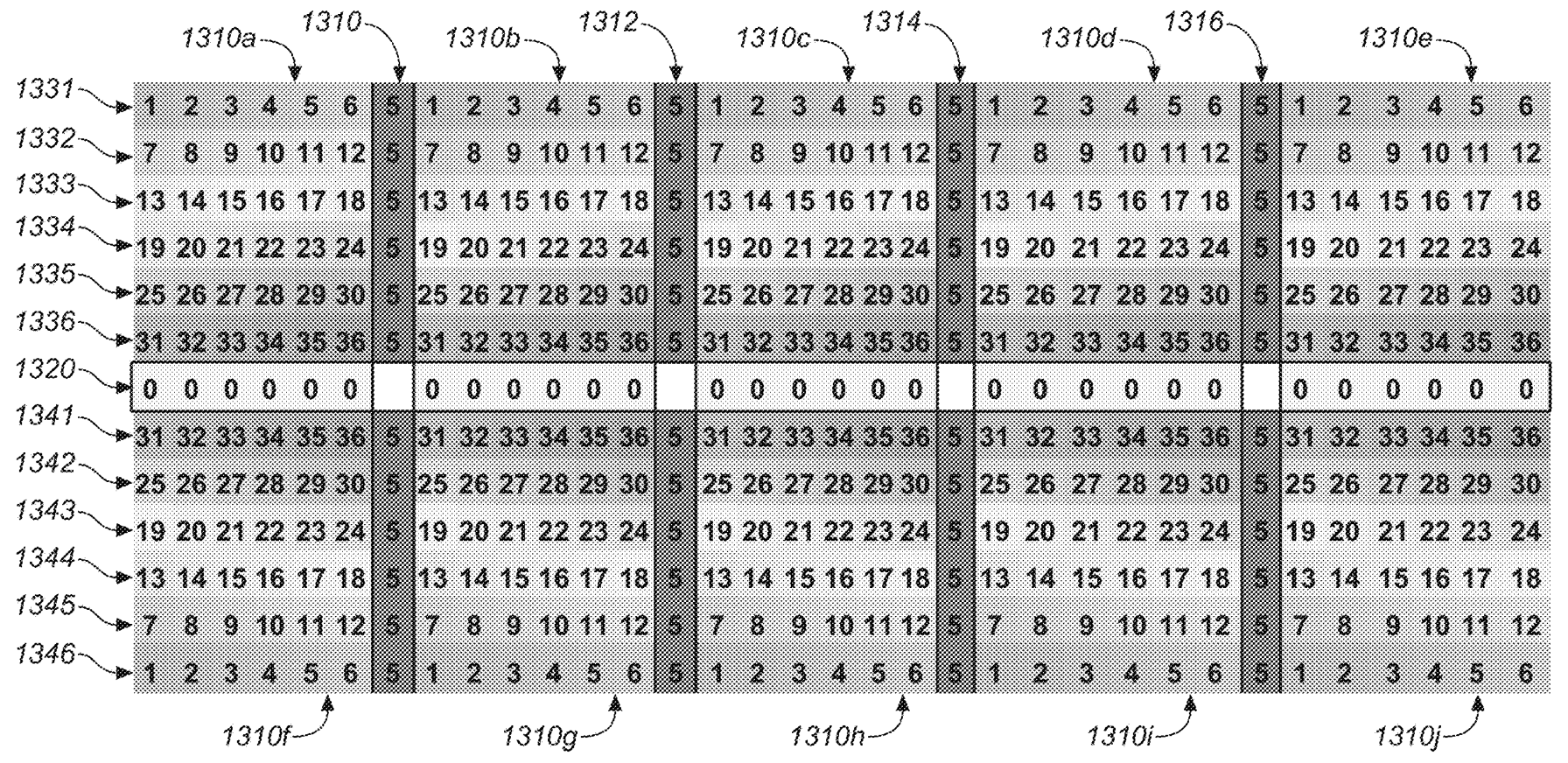

FIG. 13 illustrates an example scoring for an image including concurrently captured segments using a progressive pixel capture sequence and a non-progressive pixel capture sequence, according to an embodiment. As described above, scoring is a summation of timing differences between a pixel capture operation for adjacent pixels of adjacent segments at a contiguous boundary during the segmented image acquisition. FIG. 13 illustrates a progressive pixel capture sequence and a non-progressive pixel capture sequence where segments 1310a through 1310e use a progressive pixel capture sequence and segments 1310f through 1310j use a non-progressive pixel capture sequence. In the illustrated embodiment, the non-progressive pixel capture sequence is inverted (e.g., symmetric about a boundary between rows 1336 and 1341) relative to the progressive pixel capture sequence, where the pixel capture sequences start at the outer row of the image (e.g., rows 1331 and rows 1346). While the illustrated pixel capture sequence includes sequential pixel capture within each row (e.g., left to right), it should be appreciated that any other order (e.g., right to left, non-sequential, etc.) may be used. Moreover, it should be appreciated that rows can use different ordering of pixel capture.

The progressive pixel capture sequence of segments 1310a through 1310e is the same pixel capture sequence illustrated in FIG. 10, where the pixel capture sequence comprises sequential row-by-row pixel capture proceeding from outer rows of pixels of the segment to inner rows of pixels of the segment starting from the top row. As illustrated, with reference to segment 1310a, pixel capture proceeds pixel-by-pixel across the row 1331 (top row) from left to right, then proceeds to rows 1332 through 1336 from left to right.

The non-progressive pixel capture sequence of segments 1310f through 1310j is an inversion of pixel capture sequence used in segments 1310a through 1310e, where the pixel capture sequence comprises sequential row-by-row pixel capture proceeding from the bottom row to the top row. As illustrated, with reference to segment 1310f, pixel capture proceeds pixel-by-pixel across the row across the row 1346 (bottom row) from left to right, then proceeds to rows 1345 through 1341 from left to right.

Scoring column 1310 illustrates a score between adjacent pixels of segment 1310a to segment 1310b and adjacent pixels of segment 1310f and segment 1310g, scoring column 1312 illustrates a score between adjacent pixels of segment 1310b to segment 1310c and adjacent pixels of segment 1310g and segment 1310h, scoring column 1314 illustrates a score between adjacent pixels of segment 1310c to segment 1310d and adjacent pixels of segment 1310h and segment 1310i, and scoring column 1316 illustrates a score between adjacent pixels of segment 1310d to segment 1310e and adjacent pixels of segment 1310i and segment 1310j. Scoring row 1320 illustrates a score between adjacent pixels of segment 1310a to segment 1310f, adjacent pixels of segment 1310b and segment 1310g, adjacent pixels of segment 1310c and segment 1310h, adjacent pixels of segment 1310d and segment 1310i, and adjacent pixels of segment 1310e and segment 1310j. It should be appreciated that scoring columns 1310, 1312, 1314, and 1316, and scoring row 1320 are illustrative of scores only, and are not included within an image.

As illustrated in FIG. 13, scoring columns 1310, 1312, 1314, and 1316 show that there is a timing difference of 5 (e.g., 6 minus 1, 12 minus 7, etc.) between each adjacent pixel of adjacent segments at the contiguous boundary between the segments. Scoring row 1320 shows that there is a timing difference of zero (0) between each adjacent pixel of adjacent segments at the contiguous boundary between the segments. A summation of the timing differences illustrated in scoring columns 1310, 1312, 1314, and 1316, and scoring row 1320 is 240.

Figure 14:
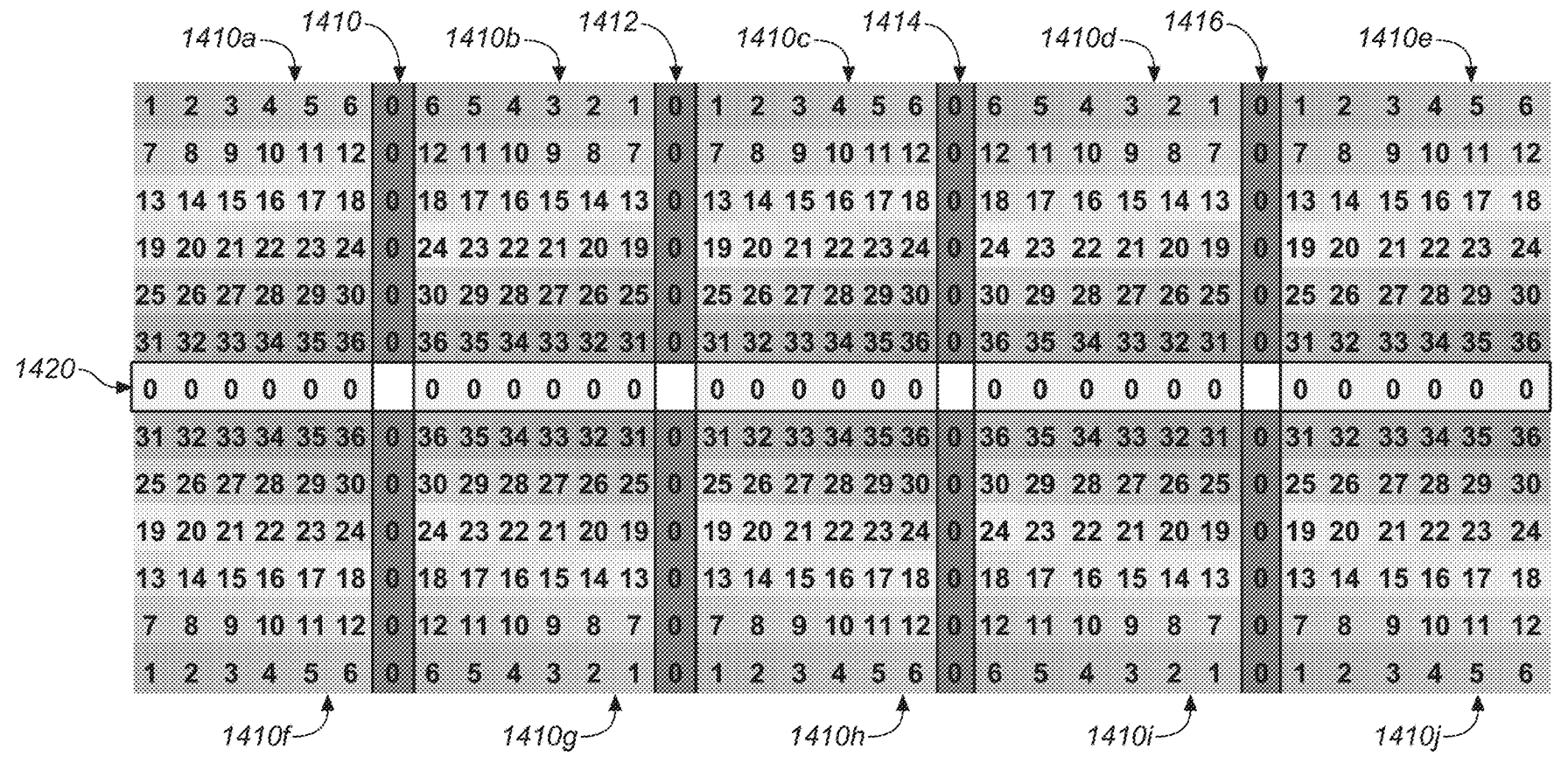

FIG. 14 illustrates an example scoring of an image including concurrently captured segments using four different pixel capture sequences, according to an embodiment. As described above, scoring is a summation of timing differences between a pixel capture operation for adjacent pixels of adjacent segments at a contiguous boundary during the segmented image acquisition. FIG. 14 illustrates a progressive pixel capture sequence and three non-progressive pixel capture sequences where segments 1410a, 1410c, and 1410e use a progressive pixel capture sequence, segments 1410b and 1410d use a first non-progressive pixel capture sequence, segments 1410f, 1410h, and 1410j use a second non-progressive pixel capture sequence, and segments 1410g and 1410i use a third non-progressive pixel capture sequence. While the illustrated pixel capture sequence includes sequential pixel capture within each row (e.g., left to right and left to right), it should be appreciated that any other non-sequential order may be used. Moreover, it should be appreciated that rows can use different ordering of pixel capture.

In the illustrated embodiments, the pixel capture sequence of adjacent segments is inverted (e.g., symmetric) relative to the shared contiguous boundary between the respective adjacent segments. For example, the pixel capture sequence of segment 1410a is inverted relative to the pixel capture sequence of segment 1410b at the shared contiguous boundary. In another example, the pixel capture sequence of segment 1410a is inverted relative to the pixel capture sequence of segment 1410f at the shared contiguous boundary Scoring column 1410 illustrates a score between adjacent pixels of segment 1410a to segment 1410b and adjacent pixels of segment 1410f and segment 1410g, scoring column 1412 illustrates a score between adjacent pixels of segment 1410b to segment 1410c and adjacent pixels of segment 1410g and segment 1410h, scoring column 1414 illustrates a score between adjacent pixels of segment 1410c to segment 1410d and adjacent pixels of segment 1410h and segment 1410i, and scoring column 1416 illustrates a score between adjacent pixels of segment 1410d to segment 1410e and adjacent pixels of segment 1410i and segment 1410j.

Scoring row 1420 illustrates a score between adjacent pixels of segment 1410*a* to segment 1410*f*, adjacent pixels of segment 1410*b* and segment 1410*g*, adjacent pixels of segment 1410*c* and segment 1410*h*, adjacent pixels of segment 1410*d* and segment 1410*i*, and adjacent pixels of segment 1410*e* and segment 1410*j*. It should be appreciated that scoring columns 1410, 1412, 1414, and 1416, and scoring row 1420 are illustrative of scores only, and are not included within an image.

As illustrated in FIG. 14, scoring columns 1410, 1412, 1414, and 1416 show that there is a timing difference of zero (0) between each adjacent pixel of adjacent segments at the contiguous boundary between the segments. Scoring row 1420 shows that there is a timing difference of zero (0) between each adjacent pixel of adjacent segments at the contiguous boundary between the segments. A summation of the timing differences illustrated in scoring columns 1410, 1412, 1414, and 1416, and scoring row 1420 is zero (0).

FIGS. 10 through 14 illustrate examples of pixel capture sequence scoring for different combinations of pixel capture sequences. It should be appreciated that many different orders and types of pixel capture sequences may be used in accordance with the described embodiments, and that the illustrated embodiments are not intended to limit the available or anticipated pixel capture sequence(s) used to perform segmented image capture. It should be further appreciated that different sensors may be subject to different hardware limits that could impact the consideration of certain types of pixel capture sequences. For example, some sensors may require that each segment use the same pixel capture sequence or that all pixel capture sequences proceed from left to right (or right to left). In some embodiments, sensors may operate using beamforming of the underlying physical components (e.g., ultrasonic transducers) such that adjacent pixels at the contiguous boundary between adjacent segments may not be captured concurrently, as the underlying component can only be used for capturing a single pixel at a time. It should be appreciated that these hardware limitations can be factored into the pixel capture sequences under consideration.

Figure 15:
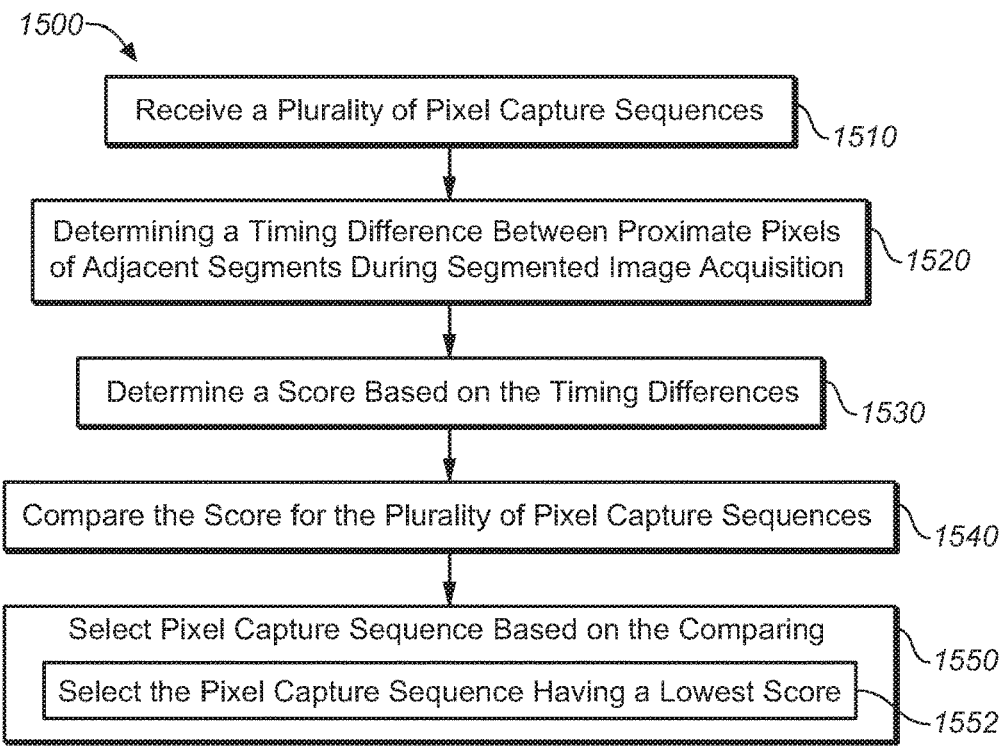
FIG. 15 illustrates a flow diagram of an example method for selection of a pixel capture sequence during segmented image acquisition, according to various embodiments.
Figure 16:
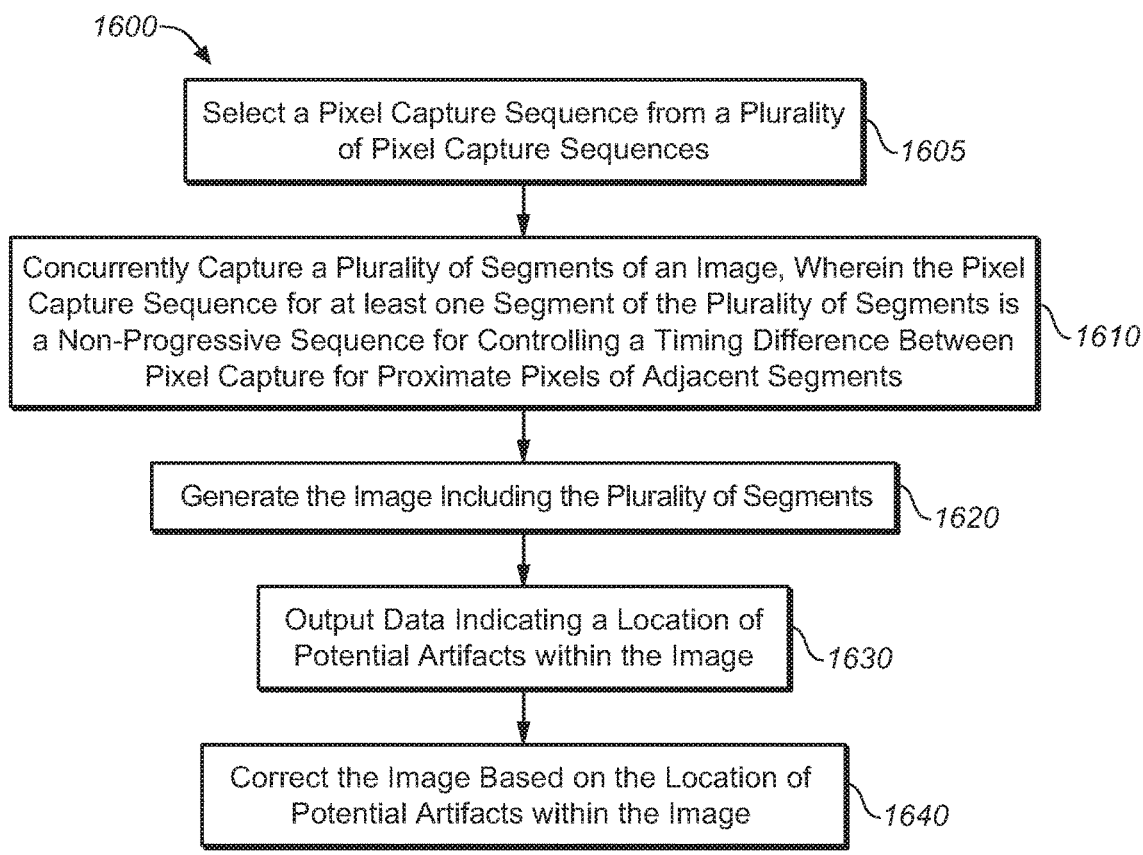
FIG. 16 illustrates a flow diagram of an example method for use of at least one non-progressive pixel capture sequence during segmented image acquisition, according to various embodiments.

Example Operations for Selection and Use of Pixel Capture Sequences During Segmented Image Acquisition FIGS. 15 and 16 illustrate flow diagrams of example methods for selection and use of pixel capture sequences during segmented image acquisition, according to various embodiments. Procedures of these methods will be described with reference to elements and/or components of various figures described herein. It is appreciated that in some embodiments, the procedures may be performed in a different order than described, that some of the described procedures may not be performed, and/or that one or more additional procedures to those described may be performed. The flow diagrams include some procedures that, in various embodiments, are carried out by one or more processors (e.g., a host processor or a sensor processor) under the control of computer-readable and computer-executable instructions that are stored on non-transitory computer-readable storage media. It is further appreciated that one or more procedures described in the flow diagrams may be implemented in hardware, or a combination of hardware with firmware and/or software.

With reference to FIG. 15, flow diagram 1500 illustrates an example method for selection of a pixel capture sequence during segmented image acquisition, according to various embodiments. In one embodiment, the method of flow diagram 1500 is performed prior to usage of a sensor, and is a configuration setting for using the sensor. At procedure 1510 of flow diagram 1500, a plurality of pixel capture sequences for capturing segments of an image at a sensor using segmented image acquisition are received. In some embodiments, the plurality of pixel capture sequences is in accordance with electronic constraints of the sensor.

At procedure 1520, during the segmented image acquisition, a timing difference between a pixel capture operation for proximate pixels of adjacent pixels of adjacent segments is determined. In one embodiment, the proximate pixels include pairs of adjacent pixels at the contiguous boundary of adjacent segments.

At procedure 1530, a score based at least in part on the timing differences for proximate pixels of adjacent segments is determined. In one embodiment, the score is based at least in part on a summation of the timing differences for proximate pixels of adjacent segments is determined. In some embodiments, a plurality of scores based at least on the timing differences for proximate pixels is determined. For example, a boundary score based at least on the timing differences for proximate pixels of adjacent segments and an internal segment score based at least on the timing differences for proximate pixels within a segment can be generated. In some embodiments, the plurality of scores can be weighted differently, e.g., depending on the context and/or usage.

At procedure 1540, the score is compared to a stored score for another pixel capture sequence.

At procedure 1550, one of the plurality of pixel capture sequences is selected based on the comparing. In one embodiment, as shown at procedure 1552, a pixel capture sequence having a lowest score is selected. In some embodiments, a pixel capture sequence having a lowest score while accounting for the electronic constraints of the sensor is selected. For example, some sensors may require a minimum timing difference between proximate pixels (e.g., a timing difference of at least 1) so as to minimize interference between pixel capture for proximate pixels. Pixel capture sequences that do not satisfy electronic constraints can be disregarded. It should be appreciated that hardware constraints may be considered at procedure 1510, such that only those pixel capture sequences satisfying electronic constraints are received.

With reference to FIG. 16, flow diagram 1600 illustrates an example method for use of at least one non-progressive pixel capture sequence during segmented image acquisition, according to various embodiments. The method of flow diagram 1600 is used during operation of a sensor capable of performing segmented image acquisition.

In some embodiments, as shown at procedure 1605, a pixel capture sequence is selected from a plurality of pixel capture sequences. For instance, different pixels capture sequences may be used depending on the required performance, available resources, and/or usage context. A first pixel capture sequence may be used when a certain performance is required, when certain resources are available, or in a certain context, while a second pixel capture sequence may be used when a different performance is required, when different resources are available, or in a different context. The different pixel capture sequence may require different processing time and or power, and may have a different total capture time. Some pixel capture sequences may have a greater performance, e.g., lead to fewer/smaller artifacts, but may require more resources. In some embodiments, a pixel capture sequence with a higher performance is selected at the expense of higher resource usage. The selection of the pixel capture sequence may be based on the application requesting the image. For example, when requiring a fingerprint image of a banking application, a high performance may be desired, regardless of the resource usage. In some embodiments, the pixel capture sequence may depend on the context, where the context may comprise information on the expected motion. For example, when motion is expected, a pixel capture sequence that reduces motion artifacts is desirable, while if no motion is detected such a pixel captures sequence is less important. This context may be based on the (active) application since in some applications the user may place the finger on the sensor, while in other applications the user may move the finger of the sensor. Context information may also be based on information from other sensors. For example, if motion or inertial sensors such as an accelerometer and/or gyroscopes are available, these sensors can give an indication of the motion of the device comprising the sensor. Higher motion of the device may increase the likelihood of the finger moving on the sensor during image capture. Therefore, when motion exceeds a certain threshold or is outside a certain range, a pixel capture sequence that reduces motion artifacts may be selected.

At procedure 1610 of flow diagram 1600, a plurality of segments of an image are captured, wherein pixels of each segment of the plurality of segments are captured according to a pixel capture sequence. The pixel capture sequence for at least one segment of the plurality of segments is a non-progressive sequence for controlling a timing difference between pixel capture for proximate pixels of adjacent segments.

In one embodiment, the pixel capture sequence for each segment of the plurality of segments is identical. In one embodiment, the pixel capture sequence comprises sequential row-by-row pixel capture proceeding from outer rows of pixels of the segment to inner rows of pixels of the segment.

In another embodiment, a first pixel capture sequence for a first portion of the plurality of segments is different than a second pixel capture sequence for a second portion of the plurality of segments. In one embodiment, the first pixel capture sequence for the first portion of the plurality of segments is inverted (e.g., symmetric) relative to the second pixel capture sequence for the second portion of the plurality of segments. In one embodiment, the plurality of segments comprises two rows of segments. In one embodiment, a first row of the two rows of segments comprises the first portion of the plurality of segments and a second row of the two rows of segments comprises the second portion of the plurality of segments, such that the first pixel capture sequence of the first row of segments is inverted relative to the second pixel capture sequence of the second row of segments. In one embodiment, the first pixel capture sequence comprises sequential row-by-row pixel capture proceeding from outer rows of pixels of a segment to inner rows of pixels of the segment. In one embodiment, the first pixel capture sequence comprises a progressive sequence and the second pixel capture sequence comprises an inverted progressive sequence.

In another embodiment, the pixel capture sequence for a segment of the plurality of segments is one of four different pixel capture sequences, wherein the four different pixel capture sequences comprise combinations of inversions of a pixel capture sequence relative to rows and columns of the plurality of segments.

At procedure 1620, the image including the plurality of segments is generated.

In one embodiment, as shown at procedure 1630, data indicating a location of potential artifacts within the image is outputted. The application of a pixel capture sequence in relation to artifacts that may occur at segment boundary may reduce the artifact, but may not eliminate the artifact completely. Therefore, in some embodiments it may be useful to know where such artifacts may exist. For example, when a fingerprint image has such artifacts, the artifact may be incorrectly interpreted by the authentication module (e.g., a matcher). The incorrect interpretation may lead to false negative, meaning that an authorized user of the device is refused access because the authentication module could not match the captured image with the reference image(s) capture during enrollment. In other words, the artifacts may be incorrected interpreted as fingerprint features, thereby negatively influencing authentication. In some embodiments, the image sensor may output data related to the location with potential artifacts. This output may be based on the determined timing difference at segment boundaries. For example, when the timing difference is above a certain threshold, that location may be consider a potential problem location. The output data related to the location with potential artifacts may be communicated to the authentication module. The authentication module may then use this data in order to minimize the influence of potential artifacts on the authentication process. For example, errors or (mis)matching information related to these locations may have a decrease weight/influence in the authentication.

In one embodiment, as shown at procedure 1640, the image is corrected based on the data indicating a location of potential artifacts within the image. In some embodiments, the information about the timing differences and/or potential problem locations may be used in an artifact correction module. The artifact correction module may correct for artifacts at the border of the segments. For fingerprint images, the correction may comprise correcting discontinuities in ridge and valley patterns. The correction may be based on the known time difference at the boundaries, and/or information about the motion of the device or the finger. This motion information may be derived from sensors or image analysis. The analysis may compare corrections at different borders, to correlate the timing differences and the required correction since similar timing differences should require comparable corrections.

What has been described above includes examples of the subject disclosure. It is, of course, not possible to describe every conceivable combination of components or methodologies for purposes of describing the subject matter, but it is to be appreciated that many further combinations and permutations of the subject disclosure are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter.

The aforementioned systems and components have been described with respect to interaction between several components. It can be appreciated that such systems and components can include those components or specified subcomponents, some of the specified components or subcomponents, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components. Any components described herein may also interact with one or more other components not specifically described herein.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

Thus, the embodiments and examples set forth herein were presented in order to best explain various selected embodiments of the present invention and its particular application and to thereby enable those skilled in the art to make and use embodiments of the invention. However, those skilled in the art will recognize that the foregoing description and examples have been presented for the purposes of illustration and example only. The description as set forth is not intended to be exhaustive or to limit the embodiments of the invention to the precise form disclosed.

What is claimed is:

1. A method of segmented image acquisition at a sensor, the method comprising:
concurrently capturing a plurality of segments of an image of an object, each segment of the plurality of segments comprising a plurality of pixels, wherein the plurality of pixels of each segment of the plurality of segments are captured according to a pixel capture sequence, wherein the pixel capture sequence for at least one segment of the plurality of segments is a non-progressive sequence for controlling a timing difference between pixel capture for proximate pixels of adjacent segments of the plurality of segments at a contiguous boundary between the adjacent segments, such that edges of the adjacent segments at the contiguous boundary are aligned to reduce motion artifacts in the image of the object due to the timing differences at the contiguous boundary; and
generating the image comprising the plurality of segments.

2. The method of claim 1, wherein the pixel capture sequence for each segment of the plurality of segments is identical.

3. The method of claim 2, wherein the pixel capture sequence comprises sequential row-by-row pixel capture proceeding from outer rows of pixels of each segment to inner rows of pixels of each segment.

4. The method of claim 1, wherein a first pixel capture sequence for a first portion of the plurality of segments is different than a second pixel capture sequence for a second portion of the plurality of segments.

5. The method of claim 4, wherein the first pixel capture sequence for the first portion of the plurality of segments is inverted relative to the second pixel capture sequence for the second portion of the plurality of segments.

6. The method of claim 5, wherein the plurality of segments comprises two rows of segments.

7. The method of claim 6, wherein a first row of the two rows of segments comprises the first portion of the plurality of segments and a second row of the two rows of segments comprises the second portion of the plurality of segments, such that the first pixel capture sequence of the first row of the two rows of segments is inverted relative to the second pixel capture sequence of the second row of the two rows of segments.

8. The method of claim 4, wherein the first pixel capture sequence comprises sequential row-by-row pixel capture proceeding from outer rows of pixels of a segment of the first portion of the plurality of segments to inner rows of pixels of the segment of the first portion of the plurality of segments.

9. The method of claim 4, wherein the first pixel capture sequence comprises a progressive sequence and the second pixel capture sequence comprises an inverted progressive sequence.

10. The method of claim 1, wherein the pixel capture sequence for a segment of the plurality of segments is one of four different pixel capture sequences, wherein the four different pixel capture sequences comprise combinations of inversions of a pixel capture sequence relative to rows and scoring columns of the plurality of segments.

11. The method of claim 1, further comprising:
selecting the pixel capture sequence from a plurality of pixel capture sequences.

12. The method of claim 11, wherein the pixel capture sequence is selected based at least in part on an application requesting the image.

13. The method of claim 1, further comprising:
outputting data indicating a location of potential artifacts within the image.

14. The method of claim 13, further comprising:
correcting the image based on the data indicating the location of potential artifacts within the image.

15. A sensor device comprising:
an array of ultrasonic transducers;
a memory; and
a processor configured to perform a method of segmented image acquisition at the array of ultrasonic transducers, the method comprising:
concurrently capturing a plurality of segments of an image of an object, each segment of the plurality of segments comprising a plurality of pixels, wherein the plurality of pixels of each segment of the plurality of segments are captured according to a pixel capture sequence, wherein the pixel capture sequence for at least one segment of the plurality of segments is a non-progressive sequence for controlling a timing difference between pixel capture for proximate pixels of adjacent segments of the plurality of segments at a contiguous boundary between the adjacent segments, such that edges of the adjacent segments at the contiguous boundary are aligned to reduce motion artifacts in the image of the object due to the timing differences at the contiguous boundary; and
generating the image comprising the plurality of segments.

16. The sensor device of claim 15, wherein a first pixel capture sequence for a first portion of the plurality of segments is different than a second pixel capture sequence for a second portion of the plurality of segments.

17. The sensor device of claim 16, wherein the plurality of segments comprises two rows of segments.

18. The sensor device of claim 17, wherein a first row of the two rows of segments comprises the first portion of the plurality of segments and a second row of the two rows of segments comprises the second portion of the plurality of segments, such that the first pixel capture sequence of the first row of the two rows of segments is inverted relative to the second pixel capture sequence of the second row of the two rows of segments.

19. A method for determining a pixel capture sequence for use in segmented image acquisition of a sensor, the method comprising:

receiving a plurality of pixel capture sequences for capturing a plurality of segments of an image at a sensor using segmented image acquisition, each segment of the plurality of segments comprising a plurality of pixels, wherein the plurality of pixel capture sequences is in accordance with electronic constraints of the sensor;

during the segmented image acquisition, determining a timing difference between a pixel capture operation for proximate pixels of adjacent segments of the plurality of segments;

determining a score based at least in part on the timing differences for the proximate pixels of adjacent segments of the plurality of segments;

comparing the score to a stored score for another pixel capture sequence; and selecting one of the plurality of pixel capture sequences based on the comparing.

20. The method of claim 19, wherein the proximate pixels comprises pairs of adjacent pixels of adjacent segments.

21. The method of claim 19, wherein the selecting one of the plurality of pixel capture sequences based on the comparing comprises:

selecting a pixel capture sequence comprising a lowest score.

* * * * *